US011934332B2

(12) United States Patent
Marcovitch et al.

(10) Patent No.: US 11,934,332 B2
(45) Date of Patent: Mar. 19, 2024

(54) DATA SHUFFLE OFFLOAD

(71) Applicant: MELLANOX TECHNOLOGIES, LTD., Yokneam (IL)

(72) Inventors: Daniel Marcovitch, Yokneam (IL); Dotan David Levi, Yokneam (IL); Eyal Srebro, Yokneam (IL); Eliel Peretz, Yokneam (IL); Roee Moyal, Yokneam (IL); Richard Graham, Yokneam (IL); Gil Bloch, Yokneam (IL); Sean Pieper, Yokneam (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/590,339

(22) Filed: Feb. 1, 2022

(65) Prior Publication Data
US 2023/0244629 A1 Aug. 3, 2023

(51) Int. Cl.
*G06F 13/42* (2006.01)
*G06F 7/76* (2006.01)
(52) U.S. Cl.
CPC .............. *G06F 13/42* (2013.01); *G06F 7/76* (2013.01)
(58) Field of Classification Search
CPC ................................... G06F 13/42; G06F 7/76
USPC ........................................................ 710/300
See application file for complete search history.

(56) References Cited

U.S. PATENT DOCUMENTS

| | | | | |
|---|---|---|---|---|
| 5,317,715 A | * | 5/1994 | Johnson | G06F 13/28 710/22 |
| 5,392,406 A | * | 2/1995 | Petersen | G06F 13/4013 710/316 |
| 5,687,328 A | * | 11/1997 | Lee | G06F 13/4013 710/307 |
| 5,687,337 A | * | 11/1997 | Carnevale | G06F 13/4013 712/E9.046 |
| 5,781,923 A | * | 7/1998 | Hunt | G06F 12/0886 711/E12.056 |
| 5,828,853 A | * | 10/1998 | Regal | G06F 7/768 711/202 |
| 5,867,690 A | * | 2/1999 | Lee | G06F 13/4013 710/65 |
| 5,878,252 A | * | 3/1999 | Lynch | G06F 9/3828 712/E9.034 |
| 5,898,896 A | * | 4/1999 | Kaiser | G06F 7/768 710/65 |
| 5,903,779 A | * | 5/1999 | Park | G06F 7/768 712/E9.034 |
| 5,907,865 A | * | 5/1999 | Moyer | G06F 13/4013 711/201 |
| 5,928,349 A | * | 7/1999 | Loen | G06F 9/3824 712/E9.046 |
| 5,961,640 A | * | 10/1999 | Chambers | G06F 13/4013 703/20 |

(Continued)

*Primary Examiner* — Paul R. Myers
(74) *Attorney, Agent, or Firm* — Sheridan Ross P.C.

(57) ABSTRACT

Devices, methods, and systems are provided. In one example, a device is described to include a device interface that receives data from at least one data source; a data shuffle unit that collects the data received from the at least one data source, receives a descriptor that describes a data shuffle operation to perform on the data received from the at least one data source, performs the data shuffle operation on the collected data to produce shuffled data, and provides the shuffled data to at least one data target.

25 Claims, 19 Drawing Sheets

(56) References Cited

U.S. PATENT DOCUMENTS

| | | | | |
|---|---|---|---|---|
| 6,081,883 A * | 6/2000 | Popelka | G06F 16/10 | 711/111 |
| 6,128,621 A * | 10/2000 | Weisz | G06F 16/258 | |
| 6,597,661 B1 * | 7/2003 | Bonn | H04L 69/161 | 370/235 |
| 6,778,181 B1 * | 8/2004 | Kilgariff | G06T 15/005 | 345/582 |
| 7,181,562 B1 * | 2/2007 | Stenfort | G06F 13/4013 | 712/225 |
| 7,877,524 B1 * | 1/2011 | Annem | G06F 13/28 | 710/22 |
| 7,881,921 B1 * | 2/2011 | Dobbelaere | G06F 9/45537 | 703/22 |
| 10,073,635 B2 * | 9/2018 | Willcock | G06F 13/4013 | |
| 2001/0038348 A1 * | 11/2001 | Suzuki | G06F 13/4013 | 341/55 |
| 2002/0069339 A1 * | 6/2002 | Lasserre | G06F 1/329 | 711/201 |
| 2004/0030856 A1 * | 2/2004 | Qureshi | G06F 9/30032 | 712/E9.034 |
| 2004/0059848 A1 * | 3/2004 | Chang | G06F 13/4013 | 710/65 |
| 2004/0153781 A1 * | 8/2004 | Lee | G06F 13/4013 | 714/25 |
| 2005/0215248 A1 * | 9/2005 | Brookshire | H04W 52/0287 | 455/426.1 |
| 2007/0150627 A1 * | 6/2007 | Gehman | G06F 13/4013 | 710/70 |
| 2008/0028197 A1 * | 1/2008 | Sawai | G06F 13/4013 | 712/E9.016 |
| 2009/0245662 A1 * | 10/2009 | Ueda | G06F 9/50 | 712/30 |
| 2009/0249032 A1 * | 10/2009 | Nishihara | G06F 9/30032 | 712/E9.034 |
| 2011/0072170 A1 * | 3/2011 | Flachs | G06F 9/30043 | 710/22 |
| 2012/0173924 A1 * | 7/2012 | Xiao | H03M 13/27 | 714/15 |
| 2013/0103870 A1 * | 4/2013 | Sanzone | G06F 13/1605 | 710/119 |
| 2014/0019710 A1 * | 1/2014 | Kataoka | G06F 12/06 | 711/202 |
| 2014/0082120 A1 * | 3/2014 | Ma | G06F 15/16 | 709/213 |
| 2014/0115270 A1 * | 4/2014 | Wu | G06F 13/1689 | 711/146 |
| 2018/0367589 A1 | 12/2018 | Levi et al. | | |
| 2020/0274733 A1 | 8/2020 | Graham et al. | | |
| 2021/0182177 A1 * | 6/2021 | Su | G06F 11/3644 | |
| 2021/0365203 A1 * | 11/2021 | O | G06F 13/4013 | |

* cited by examiner

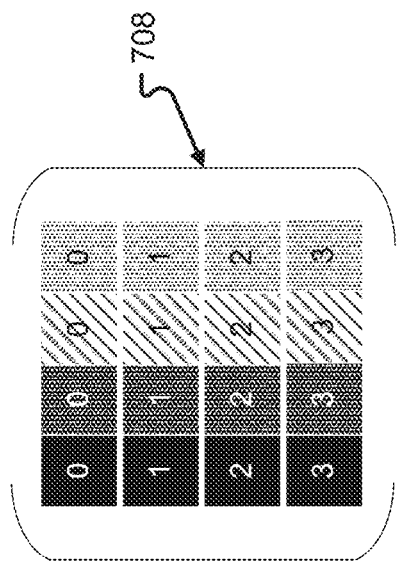
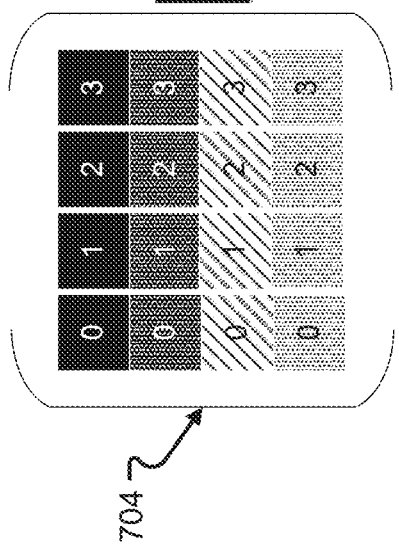
FIG. 7A
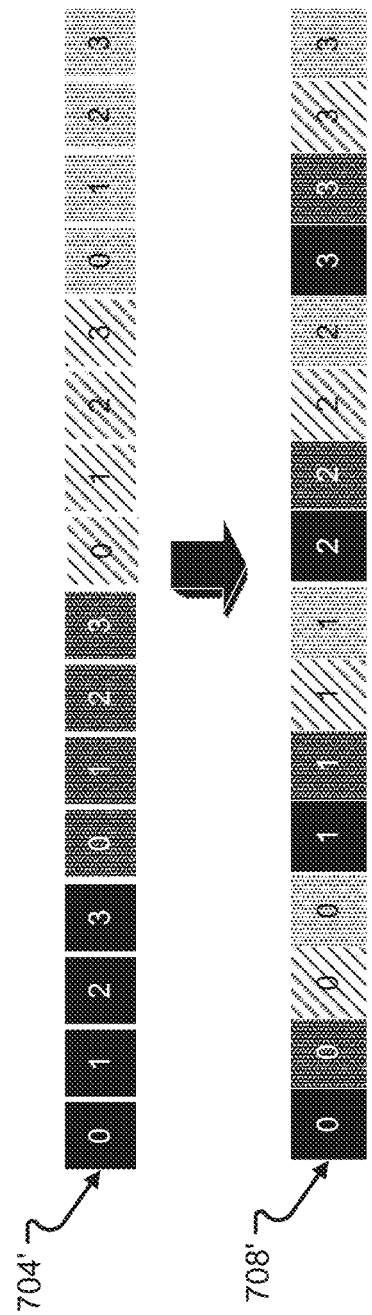
FIG. 7B

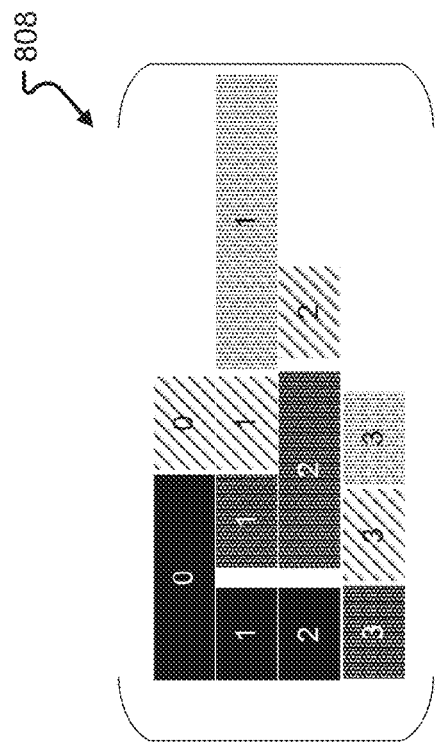
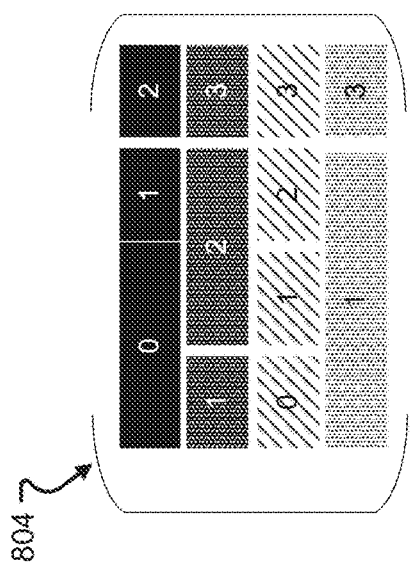
FIG. 8A
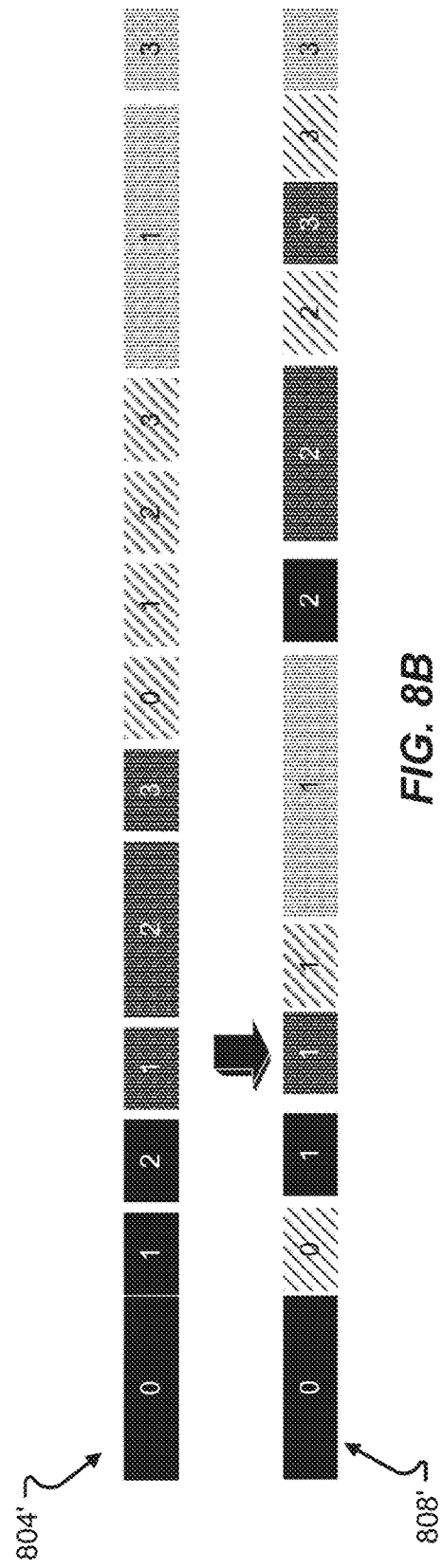
FIG. 8B

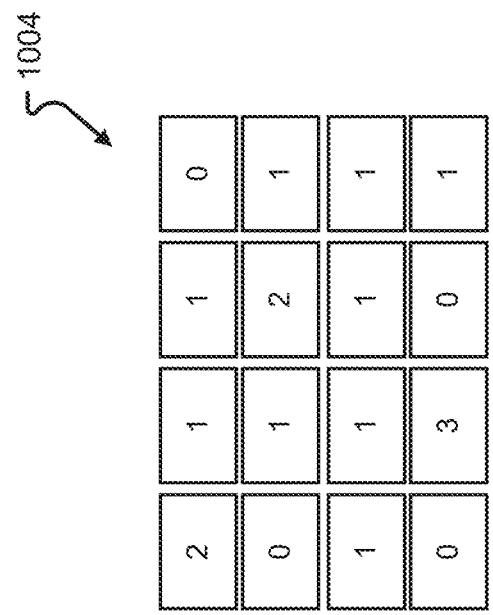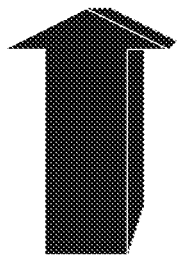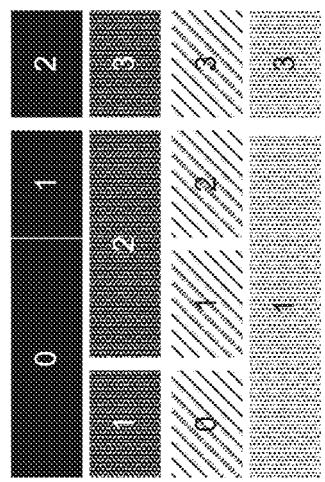
FIG. 10

DATA SHUFFLE OFFLOAD

FIELD OF THE DISCLOSURE

The present disclosure is generally directed toward networking devices and, in particular, toward enabling data shuffle operations in networking devices.

BACKGROUND

Data shuffling is a process of reorganizing a given set of data into a different layout. A matrix transpose is one example of a data shuffle operation where a two-dimensional array with homogenous element size is shuffled. Other examples of a data shuffle operation include transposing a two-dimensional array with a non-homogenous element size.

A commonality between many forms of data shuffle operations is that source data is arranged in a buffer with a high degree of contiguity. When a Central Processing Unit (CPU) or Graphics Processing Unit (GPU) of a host device or other computational node is actively performing a data shuffle operation, the resources of the CPU or GPU performing the data shuffle operation are not free to perform other tasks. Other inefficiencies associated with performing a data shuffle operation at a CPU or GPU of a host device or other computational node may also arise. A data shuffle operation may also consume memory bandwidth as the data needed to support the operation needs to be read and then written again to memory.

BRIEF SUMMARY

Embodiments of the present disclosure aim to solve the above-noted shortcomings associated with solely performing a data shuffle operation at a CPU. In some embodiments, some or all data shuffle operations that would traditionally be performed at a CPU (e.g., to accommodate application-level requirements or transport-level requirements) may be offloaded to a network device. Examples of network devices that may be configured to offload data shuffle operations may include, without limitation, a switch, a Network Interface Controller (NIC), a network adapter, an Ethernet card, an expansion card, a Local Area Network (LAN) adapter, a wireless router, physical network interface, a network border device (e.g., Session Border Controller (SBC), firewall, etc.) or similar type of device configured to perform network or data transfer processes.

Some existing NICs, for example, can map a single memory region to arbitrary physical memory locations. At first glance this seems to enable any data shuffle implementation. However, this suffers from two drawbacks: (1) a large data structure will require complex element location description (e.g., multiple {offset, size} elements) and (2) when shuffling small data elements (e.g., 8B or less)—this will require multiple Peripheral Component Interconnect express (PCIe) reads, which wastes PCIe bandwidth and encounters multiple bottlenecks in both the NIC and the CPU.

As discussed above, a data shuffle operation may be characterized by a high level of contiguity in memory of a data source. A data shuffle offload can utilize this characteristic to provide an improved shuffle rate and improve the operational efficiency of the overall computational/communication system. As an example, a data shuffle operation can be performed with a single read and a single write. As another example, a data shuffle operation may be performed without additional read and writes that are already used for networking purposes.

Illustratively, and without limitation, a network device is disclosed herein to include a data shuffle unit that is configured to receive a large portion of data to be shuffled along with a descriptor describing a shuffle pattern. The data shuffle unit may output shuffled data using dedicated circuitry, while maintaining a high shuffle rate. Output of the data shuffle unit (e.g., shuffled data) may be written to one or more locations in memory or may be transmitted over a communication network. In some embodiments, such as High Performance Computing (HPC) environment, a data shuffle operation may be performed as part of a communication scheme and may be hidden in a communication library. It may be possible to represent or modify data shuffle operations without requiring a change at an application level.

If a data shuffle unit as depicted and described herein is added to a NIC to store the data locally, reshuffle, then send onto the wire, it becomes possible to offload CPU utilization and possibly avoid unwanted CPU surges. Offloading the data shuffle operations to the NIC, for example, may also extend to the data targets, which may implement any number of different processes. This means that a device performing the data shuffle operation and a data transfer operation can be located remotely from the data source and/or data target, effectively improving scalability. This advantage is particularly highlighted if the data shuffle is needed because of the fact that a different processor has a different architecture. In such a scenario, the data shuffle operation performed in the NIC can substantially eliminate the need for the application to know anything about the other machine architecture. If, for example, the other machine has a different endianity, the NIC can offload the endianity layout between the different architectures. The offload can be done on the transmitting NIC and/or the receiving NIC. Another scenario that could benefit from the offload is one in which different machines use different floating point format precision.

In an illustrative example, a network device is disclosed that includes: a device interface that receives data from at least one data source; and a data shuffle unit that collects the data received from the at least one data source, receives a descriptor that describes a data shuffle operation to perform on the data received from the at least one data source, performs the data shuffle operation on the collected data to produce shuffled data, and provides the shuffled data to at least one data target.

In some embodiments, the data shuffle operation is done according to a descriptor provided by the at least one data source.

In some embodiments, the data shuffle unit includes a processor and memory, where the memory is used to store the data received from the at least one data source until a predetermined amount of data is collected, and where the processor performs the shuffle operation on the predetermined amount of data stored in memory.

In some embodiments, the at least one data source includes a host memory device, peer memory device, and/or on-network device memory.

In some embodiments, the data is received in a plurality of network packets.

In some embodiments, the at least one data target includes a plurality of data targets.

In some embodiments, the at least one data target includes a host memory device, a peer memory device, and/or an on-network device memory.

In some embodiments, the at least one data target is located remotely from the data shuffle unit. Illustratively, the network device may further include a second device interface that couples the network device with the data target, where the device interface includes a communication port and where the second device interface also includes a communication port.

In some embodiments, the at least one data source is located remotely from the data shuffle unit.

In some embodiments, the descriptor includes a work queue element posted to a work queue.

In some embodiments, the descriptor is obtained from a memory device of the shuffle unit and includes a memory region description that is usable to perform multiple shuffle operations.

In some embodiments, the descriptor is received in a network packet via the device interface.

In some embodiments, the descriptor is received as part of a Remote Direct Memory Access (RDMA) request or an application-level request.

In some embodiments, the device interface and the shuffle unit are provided as part of a NIC or a card including a NIC.

In some embodiments, the device interface and the shuffle unit are provided as part of a network switch.

In some embodiments, the data shuffle operation includes at least one of a matrix transpose, a non-homogenous transpose, a removal of padding bits, an addition of padding bits, a data type conversion, a tensor layout conversion, a bit packing, a component packing, and a bit tiling.

In some embodiments, an application receiving the shuffled data is unaware of the data shuffle performed by the data shuffle unit.

In some embodiments, the shuffled data is provided to the at least one data target via the device interface.

In some embodiments, the shuffled data includes fewer bits than the collected data.

In some embodiments, the at least one data source includes a network edge device.

In some embodiments, the device interface includes a serial data interface and the data is received from the at least one data source via a serial communication protocol.

In another example, a system is disclosed that includes: a device interface that receives data from at least one data source; circuitry; and memory coupled with the circuitry, where instructions stored in memory enable the circuitry to collect the data received from the at least one data source, receive a descriptor that describes a data shuffle operation to perform on the data received from the at least one data source, perform the data shuffle operation on the collected data to produce shuffled data and according to requirements of at least one data target, and then provide the shuffled data to the at least one data target.

In yet another example, a format-aware data transfer device is disclosed that includes: a first device interface enabling communications with a data source; a second device interface enabling communications with a data target; and a data shuffle unit. The data shuffle unit may include a processor and/or circuitry, and memory coupled with the processor and/or circuitry, where the processor and/or circuitry is configured to collect data received from the data source in the memory, reference a descriptor that describes a data shuffle operation to perform on the data received from the data source, shuffle the data received from the data source according to the data shuffle operation, and provide the shuffled data to the data target via the second device interface.

In some embodiments, the descriptor is stored in memory and described by a match criteria on the data.

In some embodiments, the first device interface includes a communication port.

In some embodiments, the second device interface includes an additional communication port.

In some embodiments, the second device interface connects to a communication network.

In some embodiments, the data source includes a neural network. In a further aspect, the data target may include a second neural network that is different from the neural network. Furthermore, the data received from the data source may include a first tensor layout and the shuffled data may include a second tensor layout that is different from the first tensor layout.

In some embodiments, the data received from the data source includes image data.

In some embodiments, the data received from the data source includes padded data and the shuffled data includes unpadded data.

In some embodiments, the data shuffle operation includes at least one of a matrix transpose, a non-homogenous transpose, a removal of padding bits, an addition of padding bits, a data type conversion, a tensor layout conversion, a bit packing, a component packing, and a bit tiling.

In some embodiments, the data source includes a first memory sub-system and the data target includes a second memory sub-system.

In some embodiments, the processor of the data shuffle unit is further configured to perform the data shuffle operation on the data received from the data source and produce first shuffled data for the data source as well as second shuffled data from an additional data source, where the first shuffled data is formatted differently from the second shuffled data.

In some embodiments, the descriptor defines a requirement for endianness.

In some embodiments, the first device interface includes a communication port connected with a communication network. The second device interface may include a communication port connected with the communication network or another communication network.

In some embodiments, at least one of the data source and data target include a peripheral device.

In some embodiments, the descriptor is stored in the memory.

In some embodiments, the descriptor is received from a control device that is different from the data source and the data target.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale:

FIG. 7A illustrates one example of a data shuffle operation that may be performed by a data shuffle unit in accordance with at least some embodiments of the present disclosure;

FIG. 7B illustrates another example of a data shuffle operation that may be performed by a data shuffle unit in accordance with at least some embodiments of the present disclosure;

FIG. 8A illustrates another example of a data shuffle operation that may be performed by a data shuffle unit in accordance with at least some embodiments of the present disclosure;

FIG. 8B illustrates another example of a data shuffle operation that may be performed by a data shuffle unit in accordance with at least some embodiments of the present disclosure;

FIG. 10 illustrates another example of a data shuffle operation that may be performed by a data shuffle unit in accordance with at least some embodiments of the present disclosure;

DETAILED DESCRIPTION

Figure 1A:
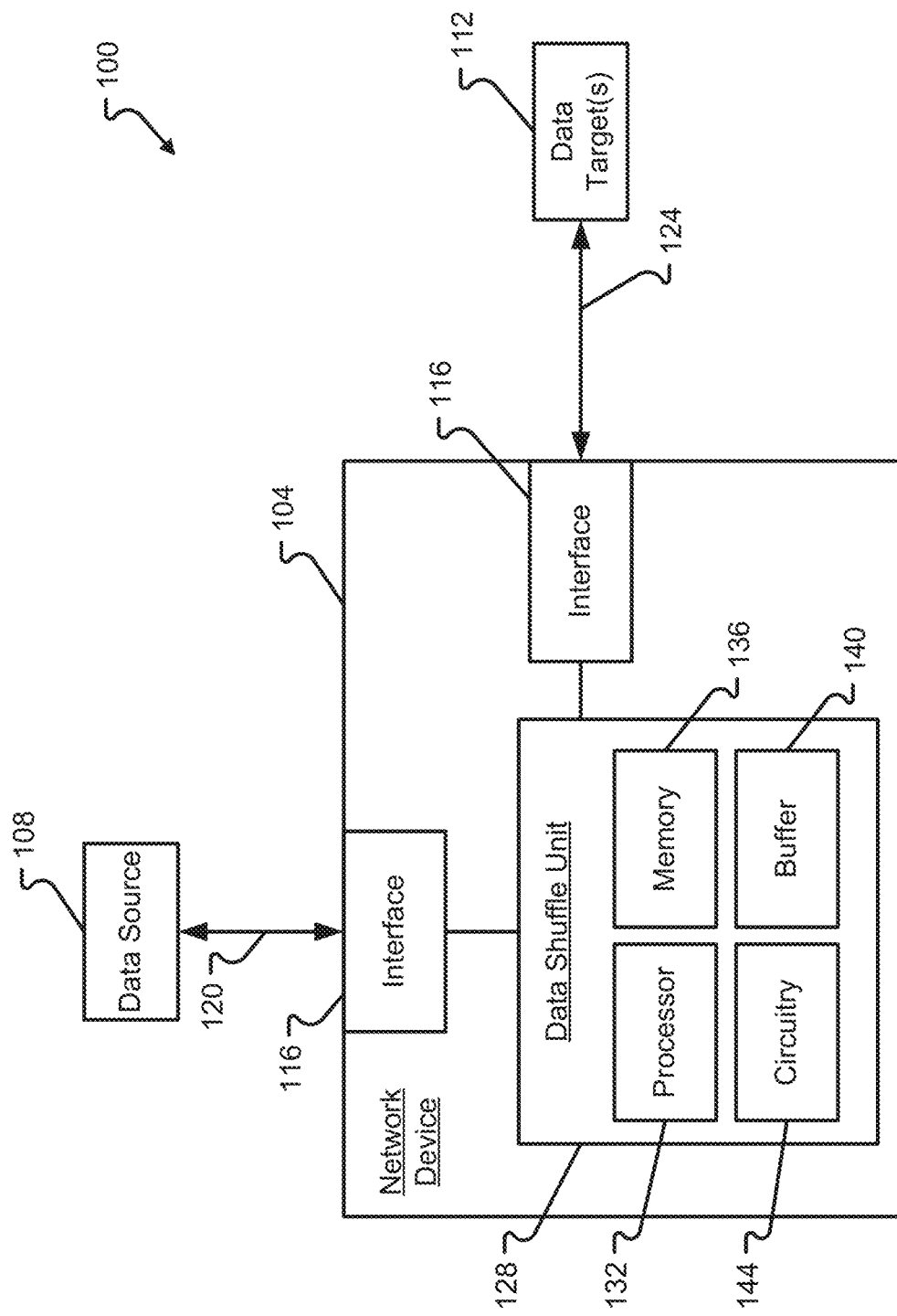
FIG. 1A is a block diagram illustrating a computing system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a Printed Circuit Board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-18, various systems and methods for implementing data shuffling in a computing or communication system will be described in accordance with at least some embodiments of the present disclosure. As will be described in more detail herein, a data shuffle unit is contemplated that is configured to receive data, perform a data shuffle operation on the data to produce shuffled data according to requirements of a data target, and then provide or transmit the shuffled data to the data target. Certain examples of a data shuffle unit will be described as being implemented in a network device such as switch, a NIC, a network adapter, an Ethernet card, an expansion card, LAN adapter, physical network interface, a wireless router, a network border device, or the like. It should be appreciated that the data shuffle unit that receives the data and performs a data shuffle operation may reside in a network device that is acting as a transmitting network device or in a network device that is acting as a receiving network device. In other words, the network device may correspond to a transmitter or receiver and the data shuffler operation may be performed prior to transmitting data across a communication network or after the data has been received from a communication network.

Figure 1B:
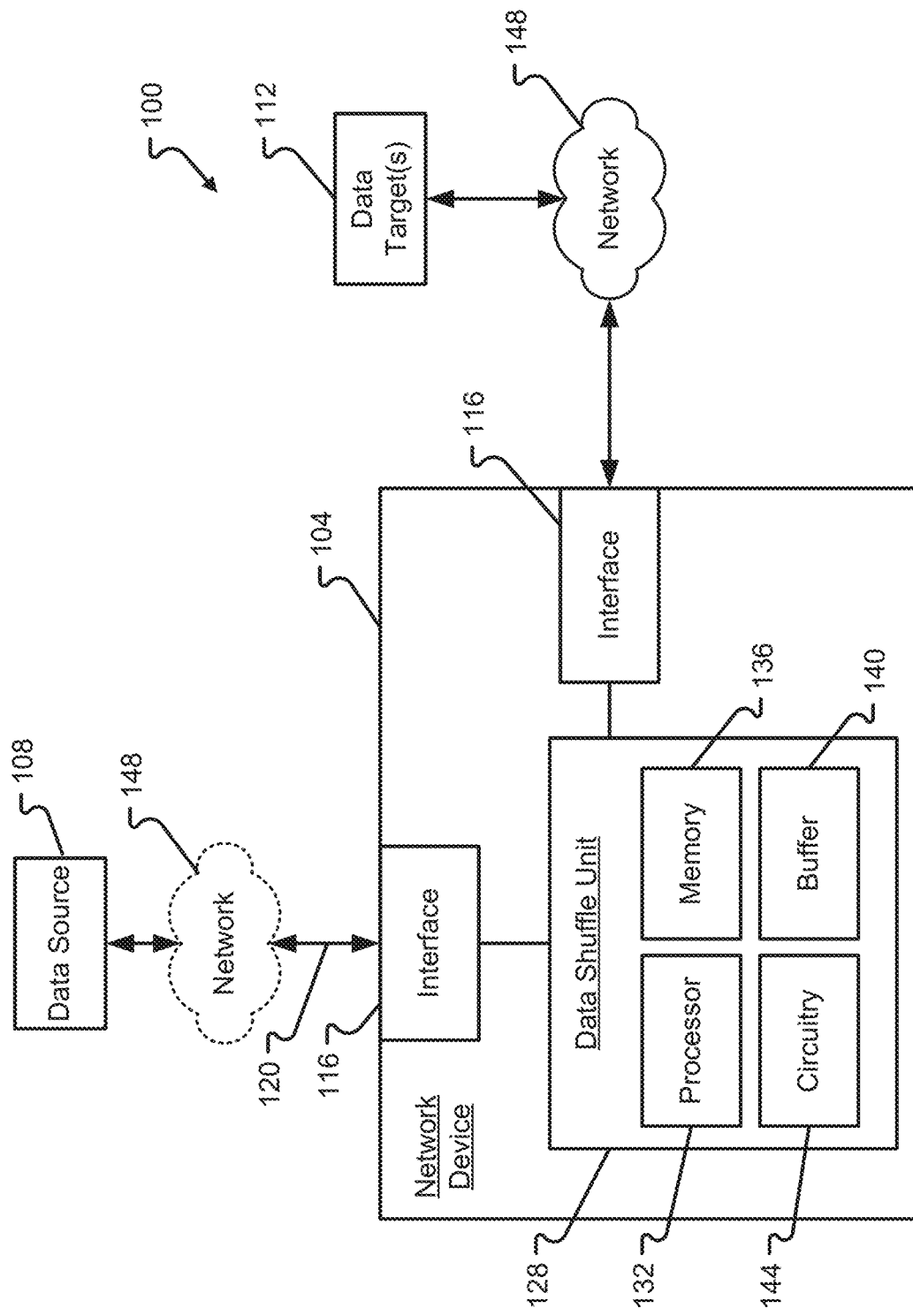
FIG. 1B is a block diagram illustrating an alternative arrangement of a computing system in accordance with at least some embodiments of the present disclosure.

Referring initially to FIGS. 1A and 1B, a first illustrative computational system 100 is shown in which a network device 104 is configured to communicate with a data source 108 and a data target 112 or multiple data targets 112. The network device 104 may include any type of device used to facilitate machine-to-machine communications. As mentioned above, the network device 104 may include one or more of a switch, a NIC, a network adapter, an Ethernet card, an expansion card, LAN adapter, physical network interface, a wireless router, a network border device, or the like. Alternatively or additionally, the network device 104 may be referred to as a data transfer device and, in some embodiments, may correspond to a format-aware data transfer device. In some embodiments, the network device 104 is provided with a data shuffle unit 128 that is configured to offload a data shuffle operation from the data source 108 and/or data target(s) 112. Specifically, the network device 104 may be configured to perform data transfer functions as well as data shuffle operations, thereby offloading certain data shuffle operations from the data source 108 and/or data target(s) 112.

The network device 104 may be connected with the data source 108 via a first device interface 116. The first device interface 116 may enable communications between the network device 104 and the data source 108 via a first communication link 120. The first communication link 120 may include a wired connection, a wireless connection, an electrical connection, etc. In some embodiments, the first communication link 120 may facilitate the transmission of data packets between the network device 104 and the data source 108 via one or more of electrical signals, optical signals, combinations thereof, and the like. The data packets may carry data from the data source 108 to the network device 104, which is intended for transmission to the data target(s) 112. In other words, the network device 104 may enable communications between the data source 108 and the data target(s) 112 and may further utilize the data shuffle unit 128 to perform a data shuffle operation while data is being transferred from the data source 108 to the data target(s) 112. It should be appreciated that the system bus (e.g., the pathway carrying data between the data source 108 and data target(s) 112) may include, without limitation, a PCIe link, a Compute Express Link (CXL) link, a high-speed direct GPU-to-GPU link (e.g., an NVlink), etc.

The network device 104 may be connected with one or more data targets 112 via a second device interface 116. The second device interface 116 may be similar or identical to the first device interface 116. In some embodiments, a single device interface 116 may be configured to operate as the first device interface 116 and the second device interface 116. In other words, a single device interface 116 may connect the network device 104 to the data source 108 and the data target(s) 112. In some embodiments, however, different physical devices may be used for the different interfaces, meaning that the first device interface 116 may correspond to a first physical device that is different from a second physical device operating as the second device interface 116. The second device interface 116 may enable communications between the network device 104 and data target(s) 112 via a second communication link 124. As can be appreciated, the second communication link 124 may include one or multiple different communication links depending upon the number of data targets in the data target(s) 112. Much like the first communication link 120, the second communication link 124 may include a wired connection, a wireless connection, an electrical connection, etc. In some embodiments, the second communication link 124 may facilitate the transmission of data packets between the network device 104 and the data target(s) 112 via one or more of electrical signals, optical signals, combinations thereof, and the like. As will be discussed in further detail herein, the second communication link 124 may carry data packets that include shuffled data that has been generated by the data shuffle unit 128 of the network device 104.

In some embodiments, the first device interface 116 and/or second device interface 116 may include a single communication port, multiple communication ports, a serial data interface, a PCIe, an Ethernet port, an InfiniBand (IB) port, etc. The first communication link 120 and/or second communication link 124 may be established using a networking cable, an optical fiber, an electrical wire, a trace, a serial data cable, an Ethernet cable, or the like. The first communication link 120 and/or second communication link 124 may utilize any type of known or yet-to-be-developed communication protocol (e.g., packet-based communication protocol, serial communication protocol, parallel communication protocol, etc.).

Source data access and/or target data access may be achieved over a system bus (e.g., locally), over a network port (e.g., remotely), or neither (e.g., for an on-device memory). While various embodiments will be depicted or described in connection with a particular type of data access, it should be appreciated that the claims are not limited to any particular type of data access.

The data source 108 and/or data target(s) 112 may correspond to or include any type of known computational device or collection of computational devices. A data source 108, for example, may include a host device, an on-network device memory, a peer device memory, etc. A data target 112, for example, may include a host memory device, an on-network device memory, a peer device memory, etc. In some embodiments, that data target(s) 112 may be located in proximity with the network device 104 (e.g., a physical cable may be used to directly connect a data target 112 with the network device 104). In some embodiments, as shown in FIG. 1B, one or more data target 112 may be located remotely from the network device 104 and the data shuffle unit 128 of the network device 104. Specifically, the data target(s) 112 may be connected to the network device 104 via a communication network 148 without departing from the scope of the present disclosure. FIG. 1B also illustrates an optional communication network 148 positioned between the data source 108 and the network device 104. It should be appreciated that the data source 108 may be remotely located from the network device 104, in which case a communication network 148 may be provided between the data source 108 and network device 104. In any configuration, the network device 104 may be configured to utilize the data shuffle unit 128 to offload at least some data shuffle operations that would otherwise be performed in a data target 112.

Other examples of a data source 108 and/or data target 112 include, without limitation, a host device, a server, a network appliance, a data storage device, a camera, a neural network, a Deep Neural Network (DNN), or combinations thereof. A data source 108 and/or data target 112, in some embodiments, may correspond to one or more of a Personal Computer (PC), a laptop, a tablet, a smartphone, a cluster, a container, or the like. It should be appreciated that a data source 108 and/or data target 112 may be referred to as a host, which may include a network host, an Ethernet host, an IB host, etc. As another specific but non-limiting example, one or more of the data source 108 and/or data target(s) 112 may correspond to a server offering information resources, services and/or applications to user devices, client devices, or other hosts in the computational system 100. It should be appreciated that the data source 108 and/or data target(s) 112 may be assigned at least one network address (e.g., an Internet Protocol (IP) address) and the format of the network address assigned thereto may depend upon the nature of the network to which the device is connected.

The network device 104 may correspond to an optical device and/or electrical device. The data shuffle unit 128 of the network device 104 may be configured to receive data from the data source 108, collect the data received from the data source until a predetermined amount of data has been collected, perform a data shuffle operation on the data after the predetermined amount of data has been collected, and then transmit the shuffled data to one or more data targets 112. In some embodiments, the data shuffle unit 128 may include components that sit between different device interfaces 116. In some embodiments, the data shuffle unit 128 may include components that process data received at a device interface 116 from the data source 108 and then transmit shuffled data to a data target 112 via the same device interface 116. The shuffled data may be transmitted directly to the data target(s) 112 (e.g., as shown in FIG. 1A) or the shuffle data may be transmitted to the data target(s) 112 via a communication network 148 (e.g., as shown in FIG. 1B).

Components that may be included as part of the data shuffle unit 128 include, without limitation, a processor 132, memory 136, a buffer 140, and/or circuitry 144. The buffer 140 may correspond to an area or type of memory device that is used to collect data received from the data source 108 before the data is shuffled according to a data shuffle operation. The buffer 140 may alternatively or additionally store shuffled data prior to the network device 104 transmitting the shuffled data to the data target(s) 112. The memory 136 may include instructions for execution by the processor 132 that, when executed by the processor 132, enable the data shuffle unit 128 to obtain a descriptor that describes a data shuffle operation to perform on the data received and collected from the data source 108. The instructions stored in memory 136 may also enable the processor to provide the shuffled data (e.g., the output of the data shuffle operation) to the data target(s) 112.

The circuitry 144 may be provided as part of the processor 132 or may be specifically configured to perform a function of the processor 132 without necessarily referencing instructions in memory 136. For instance, the circuitry 144 may include digital circuit components, analog circuit components, active circuit components, passive circuit components, or the like that are specifically configured to perform a particular data shuffle operation and/or transmission process. The circuitry 144 may alternatively or additionally include switching hardware that is configurable to selectively interconnect one device interface 116 with another device interface 116 (e.g., where the network device 104 includes a switch or a component of a switch). Accordingly, the circuitry 144 may include electrical and/or optical components without departing from the scope of the present disclosure.

The processor 132 and/or circuitry 144 may include one or more Integrated Circuit (IC) chips, microprocessors, circuit boards, CPUs, Graphics Processing Units (GPUs), Data Processing Units (DPUs), simple analog circuit components (e.g., resistors, capacitors, inductors, etc.), digital circuit components (e.g., transistors, logic gates, etc.), registers, Field Programmable Gate Arrays (FPGAs), Application Specific Integrated Circuits (ASICs), combinations thereof, and the like. It should be appreciated that the processor 132 may correspond to an optional component of the data shuffle unit 128, especially in instances where the circuitry 144 provides sufficient functionality to support operations of the data shuffle unit 128 described herein.

The memory 136 may include any number of types of memory devices. As an example, the memory 136 may include Random Access Memory (RAM), Read Only Memory (ROM), flash memory, Electronically-Erasable Programmable ROM (EEPROM), Dynamic RAM (DRAM), buffer 140 memory, combinations thereof, and the like. In other words, the buffer 140 may be provided as part of memory 136 without departing from the scope of the present disclosure.

Although FIGS. 1A and 1B illustrate a single data source 108 and a single box representing data target(s) 112, it should be appreciated that the network device 104 may be configured to receive data from one, two, three, . . . , or many more data sources 108. The network device 104 may also be configured to provide shuffled data to one, two, three, . . . , or many more data targets 112. The illustration of a single data source 108 and single box representing data target(s) 112 is for illustration purposes only and should not be construed as limiting the scope of the claims. Indeed, aspects of the present disclosure contemplate the ability of the network device 104 to receive data from a single data source 108 and provide shuffled data to one or many data targets 112. The network device 104 may be configured to specify multiple different data shuffles (e.g., on the same data received from one or more data sources 108), which produce different types of shuffled data, and each type of shuffled data may be provided to a different data target 112. As a non-limiting example, a network device 104 may receive raw images from one or more data sources 108 and then specify a number of different data shuffle operations for the raw images. Each instance of the raw image shuffled according to a different data shuffle operation may be provided to a different data target 112.

Figure 2:
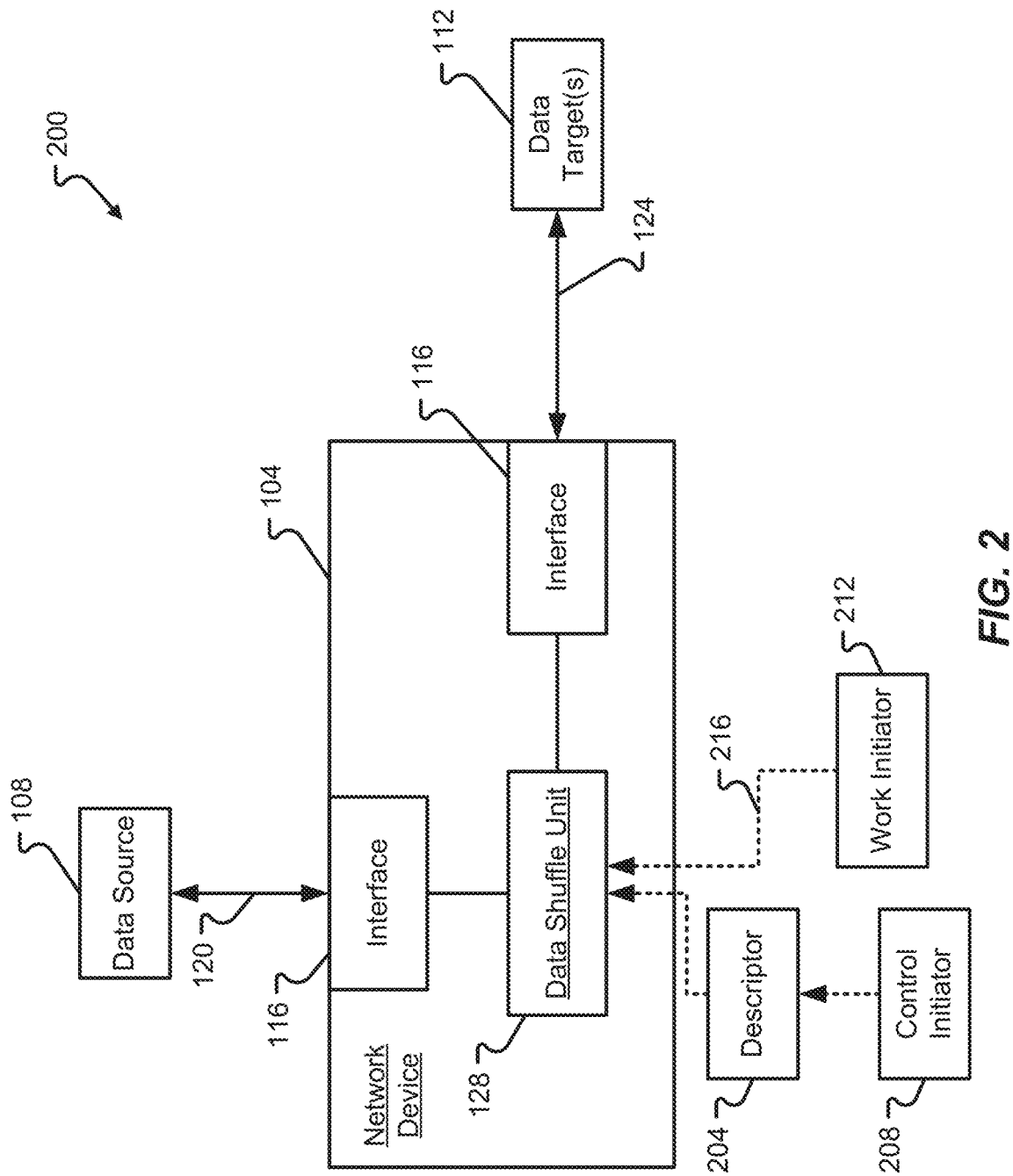
FIG. 2 is a block diagram illustrating details of a network device operating in conjunction with a control initiator and work initiator in accordance with at least some embodiments of the present disclosure.

With reference now to FIG. 2, additional details of a network device 104 and a data shuffle unit 128 included in a network device 104 will be described in accordance with at least some embodiments of the present disclosure. Moreover, details of a control initiator 208 and work initiator 212 and their cooperation with a network device 104 will be described in accordance with at least some embodiments of the present disclosure.

In some embodiments, a compact descriptor 204 may be prepared by a control initiator 208 and provided to the data shuffle unit 128 of the network device 104. The descriptor 204 may include a description of a data shuffle operation to be performed by the data shuffle unit 128 prior to initiating a data shuffle operation and/or prior to receiving data from a data source 108 that will have the data shuffle operation applied thereto. The data shuffle unit 128 may store the descriptor 204 in memory 136 so that a local description of the data shuffle operation is readily available when the data shuffle unit 128 begins processing data from the data source 108 for transmission to the data target(s) 112 as shuffled data. In some embodiments, the descriptor 204 may be requested by the network device 104 from the control initiator 208 when a data shuffle operation is to be performed (e.g., the descriptor 204 may be retrieved in response to receiving data from the data source 108). Alternatively or additionally, the data shuffle unit 128 may be initiated by a work initiator 212 transmitting a work initiation signal 216.

The data to be shuffled by the data shuffle unit 128 may be received from the data source 108 and collected in the buffer 140. The data shuffle operation may be initiated by the work initiator 212 whereas the descriptor 204 is provided to the network device 104 from the control initiator 208. It should be appreciated that the data source 108, control initiator 208, and work initiator 212 may be one or multiple entities. In other words, a single device may include or act as one, some, or all of the data source 108, the control initiator 208, and the work initiator 212. Alternatively, each of the data source 108, control initiator 208, and work initiator 212 may be provided in different devices.

The data shuffle unit 128 may be configured to shuffle data received from the data source 108 according to the descriptor 204 (e.g., perform a shuffle operation), which describes a data shuffle operation to be performed according to requirements of a data target 112 or multiple data targets 112. In other words, the descriptor 204 may provide the data shuffle unit 128 with the information that enables the data shuffle unit 128 to perform the appropriate data shuffle operation prior to transmitting data received from the data source 108 to the data target(s) 112. As will be described in more detail below, the data target(s) 112 may correspond to a destination buffer or a network location.

In some embodiments, the descriptor 204 may assume a number of different types or formats. Illustratively, but without limitation, the descriptor 204 may include a Work Queue Element (WQE) posted to a work queue (e.g., a queue pair), a memory region description, and/or a network packet description (e.g., a description of a Remote Direct Memory Access (RDMA) request and/or a description of an application-level request). When provided as a WQE, the descriptor 204 may represent or include a single data shuffle operation to be performed by the data shuffle unit 128.

When provided as a memory region description, the descriptor 204 may facilitate mapping the region/shuffle type once, then can be used multiple times while performing the data shuffle operation. This also allows a standard RDMA READ/WRITE operation to perform high-rate data shuffle operations on data in transit (e.g., data passing through the network device 104). In this example, the descriptor may be mapped once but used multiple times by a local RDMA operation performed by the network device 104.

When provided as part of a network packet, the descriptor 204 may be sent either as a type of RDMA request or encapsulated as an application-level request. This allows shuffle type to be defined remotely by the RDMA work initiator 212.

As discussed above, the data source 108 may be located in host memory. Alternatively or additionally, the data source 108 may be located in an on-network device memory such that data to be shuffled by the data shuffle unit 128 may be read from the on-network device memory. Alternatively or additionally, the data source 108 may be located on the network 148 such that when the data shuffle request is received as part of a network packet, the data to be shuffled may also arrive as part of one or more network packets.

The data target(s) 112 may be located in host memory. Alternatively or additionally, the data target(s) 112 may be located in an on-network device memory such that shuffle data may be written to the on-network device memory. In this example, the shuffled data written to the on-network device memory may be read by subsequent local RDMA operations. Alternatively or additionally, the data target(s) 112 may be located on the network 148 such that shuffled data may be written directly over the network 148 to one or more remote data targets 112.

Again, there may be different types of descriptors 204. Various descriptor 204 types may be used to most efficiently describe a data shuffle operation to be performed by the data shuffle unit 128 of the network device 104. Non-limiting examples of data shuffle operations include a matrix transpose, a non-homogeneous transpose, a removal of padding bits, an addition of padding bits, a data type conversion, a tensor layout conversion, a bit packing, a component packing, and a bit tiling. Due to its homogeneous nature, a matrix transpose can be described with a relatively compact descriptor 204, which defines: (1) a number of rows; (2) a number of columns; and (3) an element size. Examples of a data shuffle operation implemented as a matrix transpose are depicted in FIGS. 7A and 7B. In the example of FIG. 7A, a first matrix 704 is transposed into a second matrix 708 of the same dimensions. In other words, the first matrix 704 and second matrix 708 may each correspond to two-dimensional matrices of the same size/number of rows and columns. In the example of FIG. 7B, a first one-dimensional matrix 704' (which is depicted as a one-dimensional representation of the first matrix 704) is transposed into a second one-dimensional matrix 708' (which is depicted as a one-dimensional representation of the second matrix 708).

A non-homogeneous transpose may also be implemented using an appropriate descriptor 204. FIGS. 8A and 8B illustrate two examples of a non-homogenous transpose that may be implemented by the data shuffle unit 128 using a descriptor 204 that describes the various element sizes in a size matrix. FIG. 8A illustrates a first matrix 804 being transposed into a second matrix 808 of a different size/dimension than the first matrix 804. In the example of FIG. 8B, a first one-dimensional matrix 804' (which is depicted as a one-dimensional representation of the first matrix 804) is transposed into a second one-dimensional matrix 808' (which is depicted as a one-dimensional representation of the second matrix 808). FIG. 10 illustrates another example of a non-homogenous transpose in which the first matrix 804 can be described by a size matrix 1004. The size matrix 1004 illustratively contains the following elements (element (0,0)

is size 2, element (0,1) is size 1, element (0,2) is size 1, element (0,3) is size zero, element (1,0) is size zero, . . . , etc.). A descriptor 204 can be provided that includes sufficient information to perform a non-homogeneous transpose as shown in any of FIG. 8A, 8B, or 10.

Figure 9:
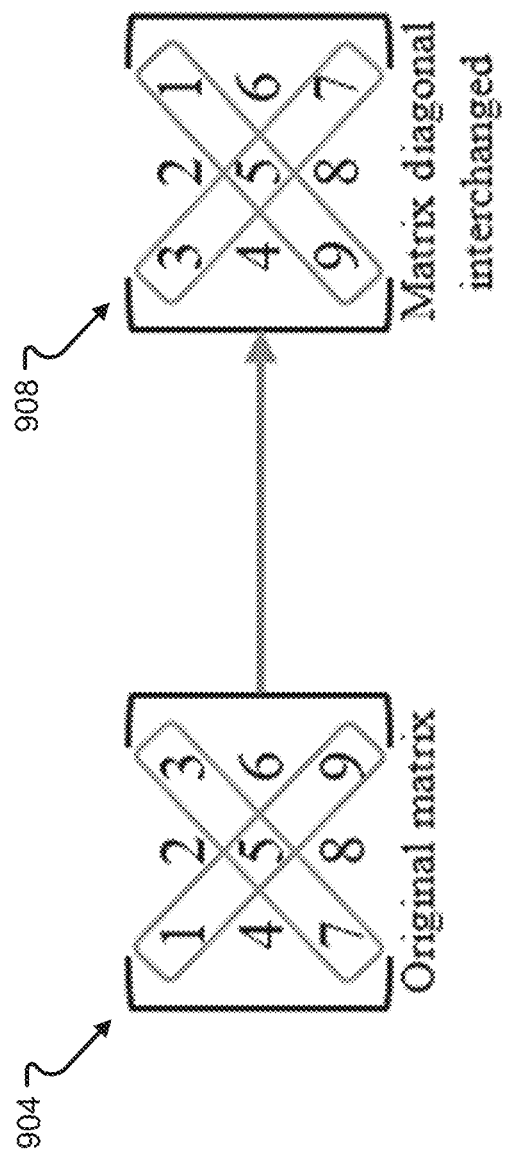
FIG. 9 illustrates another example of a data shuffle operation that may be performed by a data shuffle unit in accordance with at least some embodiments of the present disclosure.

Another type of data shuffle operation that may be performed by the data shuffle unit 128 with an appropriate descriptor 204 is matrix diagonal interchange as shown in FIG. 9. Specifically, the example of FIG. 9 illustrates that the data shuffle unit 128 may be configured, with an appropriate descriptor 204, to transpose a first matrix 904 to a second matrix 908 in which the second matrix 908 has a matrix diagonal interchanged.

Figure 3:
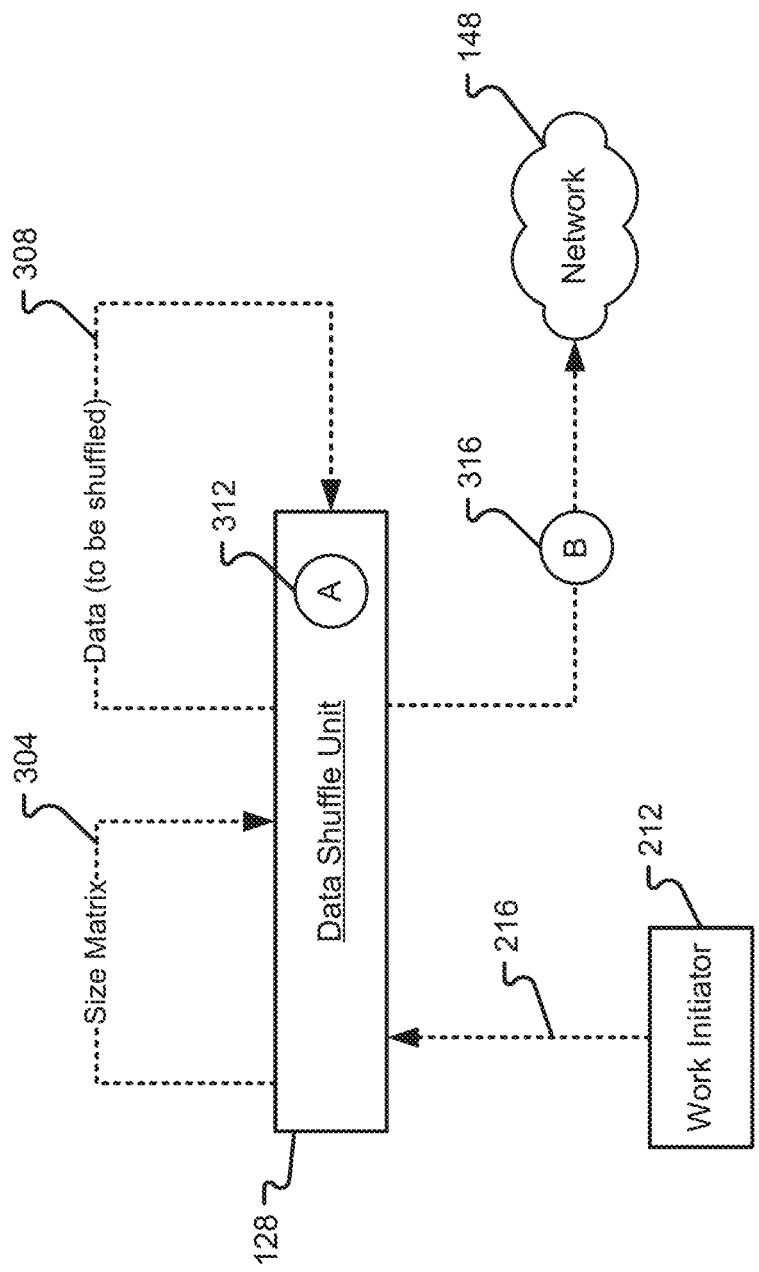
FIG. 3 is a block diagram illustrating additional details of a data shuffle unit in accordance with at least some embodiments of the present disclosure.

With reference now to FIGS. 3-6, additional examples of data shuffle operations that may be performed by the data shuffle unit 128 of the network device 104 will be described in accordance with at least some embodiments of the present disclosure. Referring first to FIG. 3, the data shuffle unit 128 is shown to perform a data shuffle operation on data received from a data source 108 that is located in host memory. In this particular example, the data shuffle unit 128 may receive a work request 216 that includes a compact descriptor 204 and a possible size matrix 304 (which may be similar to size matrix 1004). The size matrix 304 may correspond to a pointer or inline data.

In the example of FIG. 3, the data target(s) 112 may include either host memory 312 or network-device memory 316. In the situation where the data target(s) 112 include host memory 312, the data shuffle unit 128 may receive a descriptor 204 that includes a data pointer, a description of a number of rows to output in shuffled data, a description of a number of columns to output in shuffle data, and/or a description of element sizes. Information provided in the descriptor 204 and used by the data shuffle unit 128 to perform the data shuffle operation on the data to be shuffled 308 (e.g., the data received and collected from the data source 108) may enable the data shuffle unit 128 to perform the data shuffle operation prior to transmitting the shuffled data to the data target(s) 112. The data to be shuffled 308 may include electronic data in any number of different data formats. Non-limiting examples of data to be shuffled 308 include processed images, raw images, compressed images, data files, pixel data, combinations thereof, and the like. Illustratively, the data shuffle unit 128 may be configured to process pixel data and perform a data shuffle operation that results in bit-packing, pixel reordering, pixel regrouping, etc. Alternatively or additionally, the data shuffle unit 128 could be configured to perform typecasting or the like (e.g., changing data from a format like floating point-32 (FP32) to another format like floating point-28 (FP8)), which results in a data reduction. This may be performed as part of a data shuffle operation or in addition to performing a data shuffle operation.

In one option, the data 308 shuffled by the data shuffle unit 128 (e.g., shuffled data 312) may be written to host memory to enable local CPU operation acceleration. Alternatively or additionally, the data 308 shuffled by the data shuffle unit 128 (e.g., shuffled data 316) may be stored in the network-device memory when staging data as a preparation for subsequent network operations (e.g., RDMA WRITE or READ). Alternatively or additionally, the data 308 shuffled by the data shuffle unit 128 (e.g., shuffle data 316) may be sent across the network 148. In this example, the information provided in the descriptor 204 may enable an all-to-all operation and may include a data pointer and a size matrix pointer. Additional details of an all-to-all operation are provided in U.S. Patent Publication No. 2018/0367589, the entire contents of which are hereby incorporated herein by reference.

Figure 4:
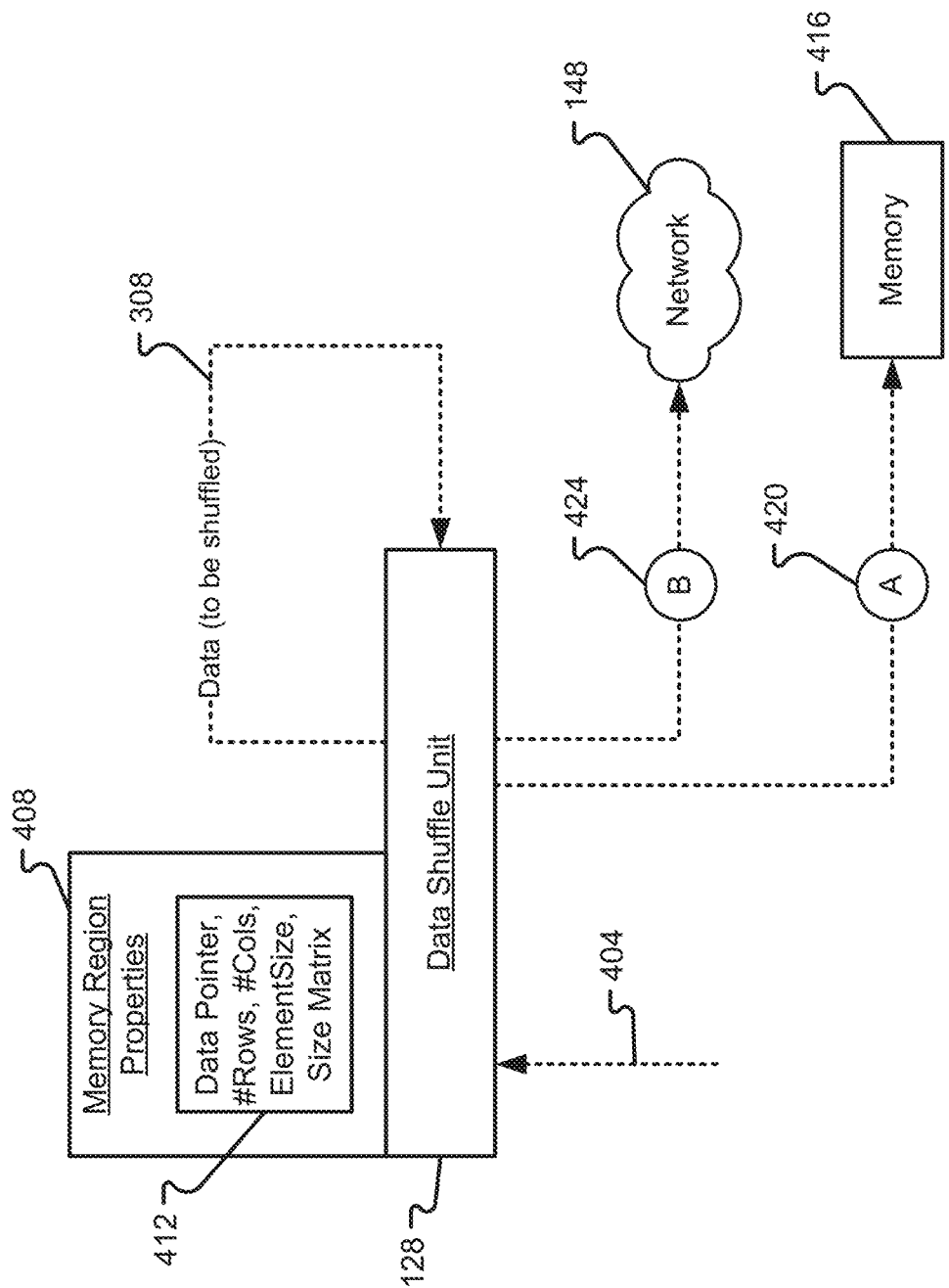
FIG. 4 is a block diagram illustrating additional details of a data shuffle unit in accordance with at least some embodiments of the present disclosure.

With reference now to FIG. 4, the data shuffle unit 128 is shown to perform a data shuffle operation on a work request 216 that is a local DMA request or RDMA request 404. The data shuffle unit 128 may be provided with a descriptor 204 including memory region properties 408. The memory region properties 408 provided as part of the descriptor 204 may include parameters 412 such as a data pointer, a description of a number of rows to output in shuffled data, a description of a number of columns to output in shuffled data, a description of element sizes, and/or a size matrix. The data pointer, description of the number of rows to output in the shuffled data, description of the number of columns to output in the shuffled data, and the description of element size may be used when shuffled data 420 is written to local memory 416. The data pointer and size matrix may be used when shuffled data 424 is provided to the network 148.

Figure 5:
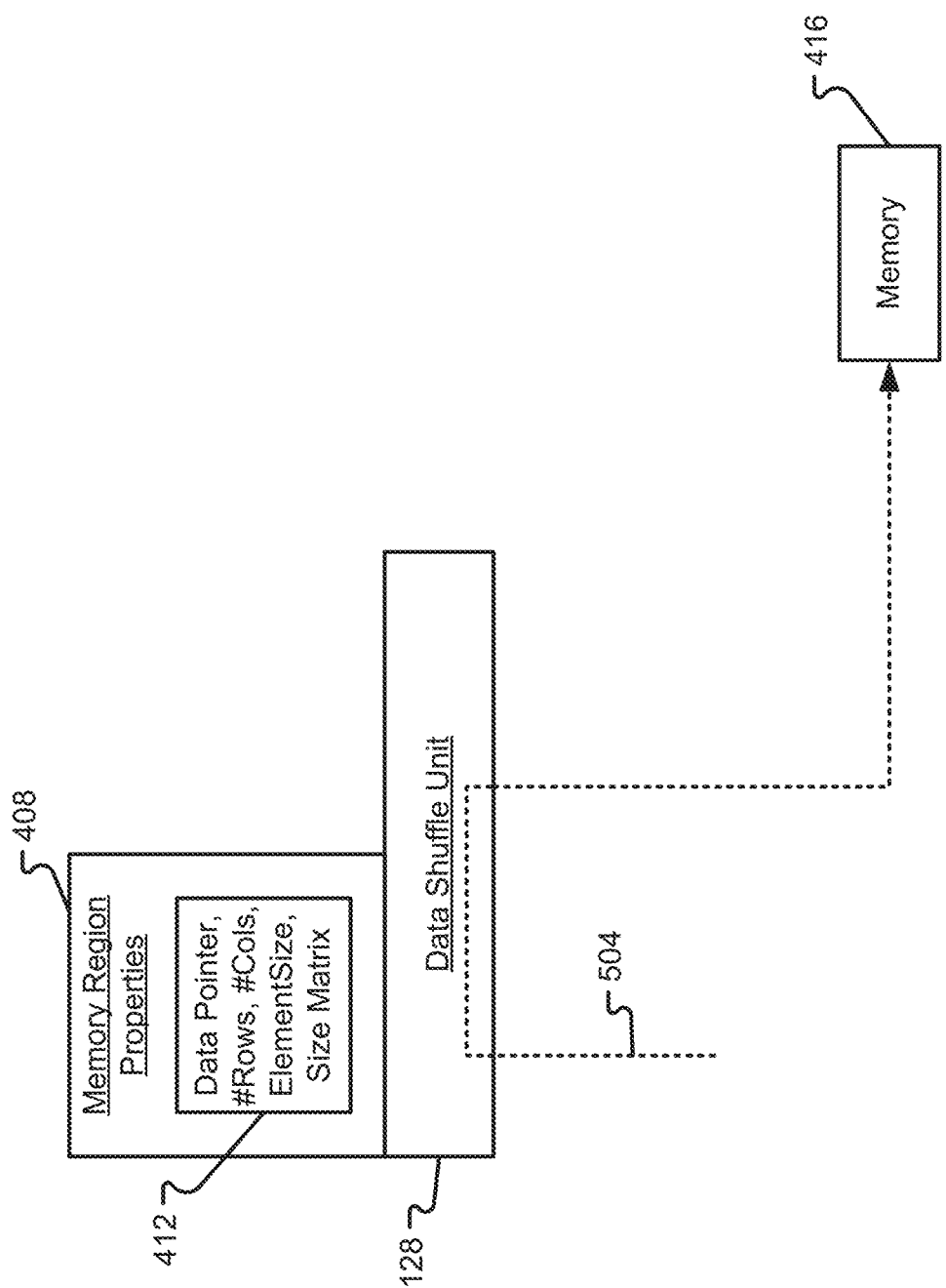
FIG. 5 is a block diagram illustrating additional details of a data shuffle unit in accordance with at least some embodiments of the present disclosure.
Figure 6:
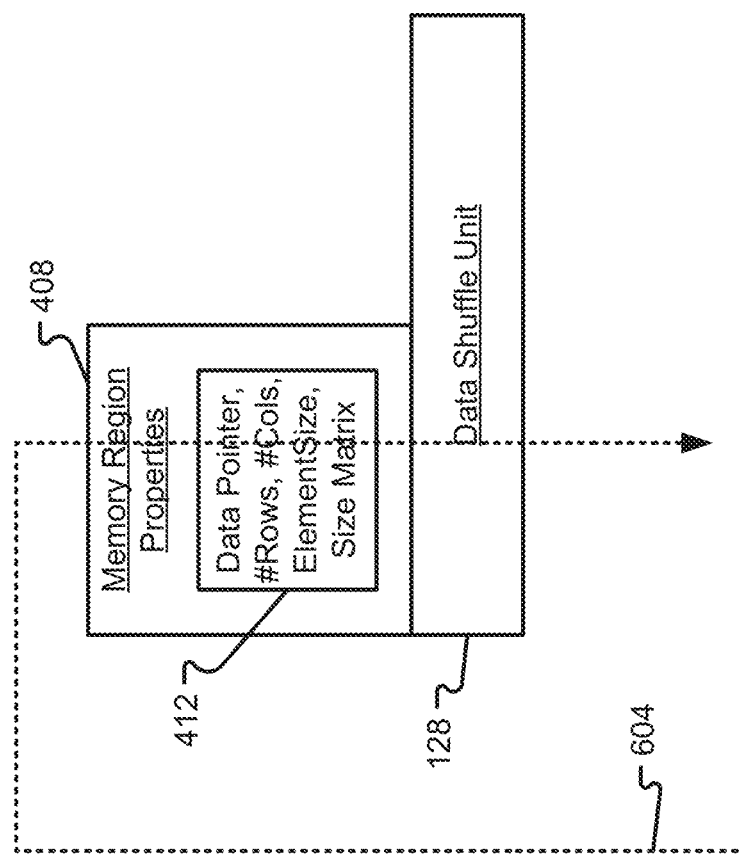
FIG. 6 is a block diagram illustrating additional details of a data shuffle unit in accordance with at least some embodiments of the present disclosure.

In the example of FIGS. 5 and 6, the data shuffle unit 128 is shown to perform a REMOTE operation. Here the work request 216 received at the data shuffle unit 128 illustratively includes an RDMA WRITE request 504 or RDMA READ request 604. Like the example of FIG. 4, the memory region properties 408 contains a description of the data shuffle manipulation to be performed by the data shuffle unit 128. The data transfer can be initiated, for example, using the RDMA READ request 504 where the memory region 408 is either the data source 108 or data target 112 of the RDMA operation. Here also, the data received from the data source 108 may arrive from the network 148 or be read from host memory. The data shuffle unit 128 may respond to the request 504 by shuffling data from the data source 108 and providing the shuffled data to memory 416. Alternatively, for an RDMA READ request 604, the network device 104 may provide the shuffle data over the network 148.

Figure 11:
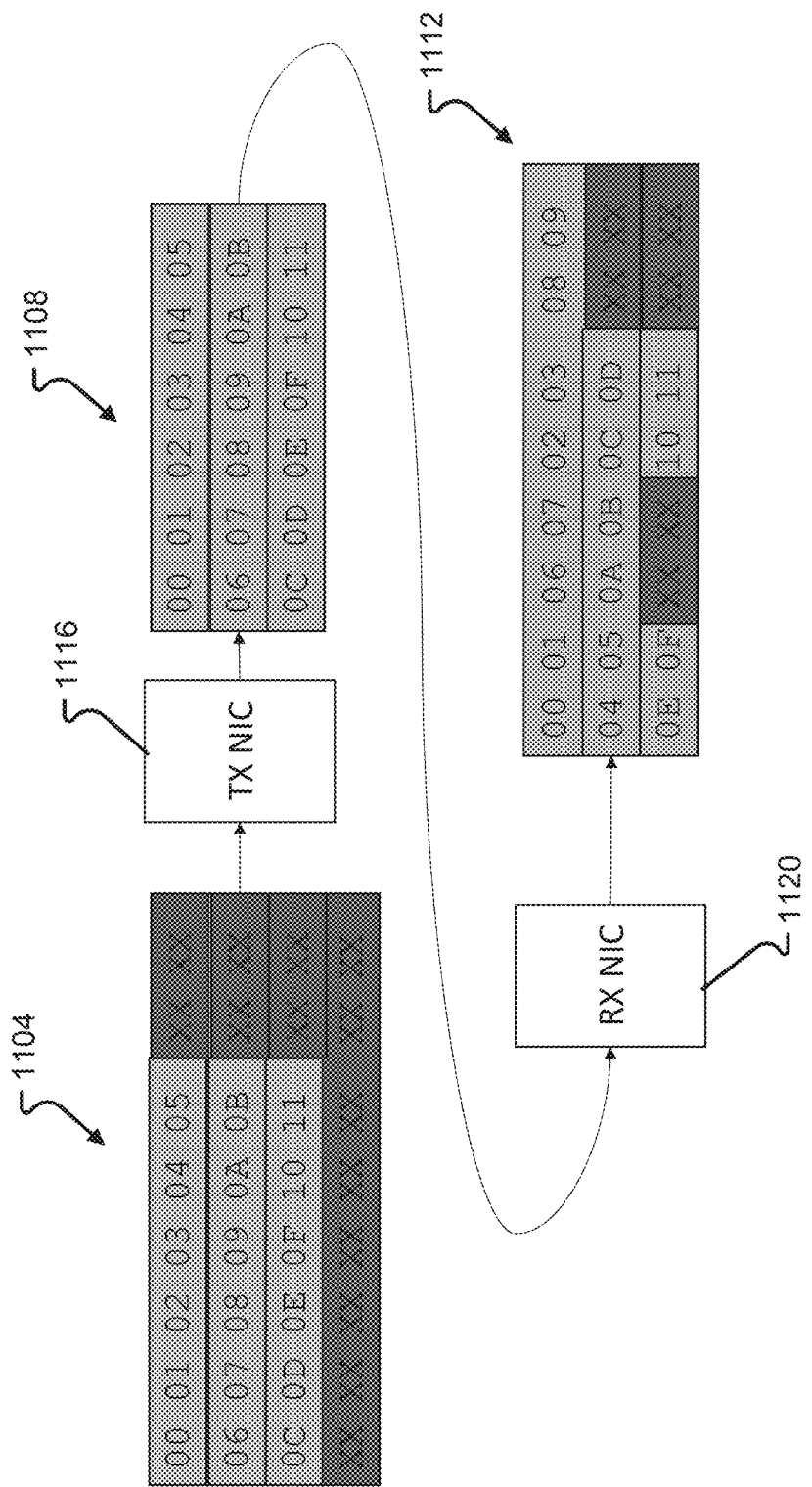
FIG. 11 illustrates another example of a data shuffle operation that may be performed by a data shuffle unit or multiple data shuffle units in accordance with at least some embodiments of the present disclosure.

Yet another example of a data shuffle operation that may be performed by one or more network devices 104 will be described with reference to FIG. 11. In this particular example, a transmitting NIC 1116 and receiving NIC 1120 are shown to work in cooperation with one another to perform a pitch-linear->unpadded->tiled data shuffle operation. The transmitting NIC 1116 and receiving NIC 1120 may both correspond to examples of a network device 104 without departing from the scope of the present disclosure. Specifically, both the transmitting NIC 1116 and receiving NIC 1120 may include a data shuffle unit 128.

In some embodiments, a first matrix 1104 is shown as a pitch-linear surface with padding to width and possibly to height to machine words. As an example, the first matrix 1104 may include image data that is stored in raster order. The transmitting NIC 1116 may receive the first matrix 1104 and invoke its data shuffle unit 128, which references an appropriate descriptor to implement a data shuffle operation. The data shuffle operation may be performed to format the data from the first matrix 1104 according to a data format requirement of a data target (e.g., the receiving NIC 1120 or a device in communication with the receiving NIC 1120). Upon referencing a descriptor available to the transmitting NIC 1116, the data shuffle unit 128 of the transmitting NIC 1116 may remove the padding of the first matrix 1104 prior to transmitting first shuffled data (e.g., as a second matrix 1108) across a communication network. Transmitting unpadded data as compared to the first matrix 1104 may help to minimize undesirable bandwidth usage.

At the opposite side of the network, the receiving NIC 1120 may receive the first shuffled data and invoke its data shuffle unit 128 to store additional shuffled data (e.g., as a third matrix 1112). The third matrix 1112 may include the original data from the first matrix 1104 in a tiled order with padding appropriate for another computational device (e.g., a downstream accelerator).

Figure 12:
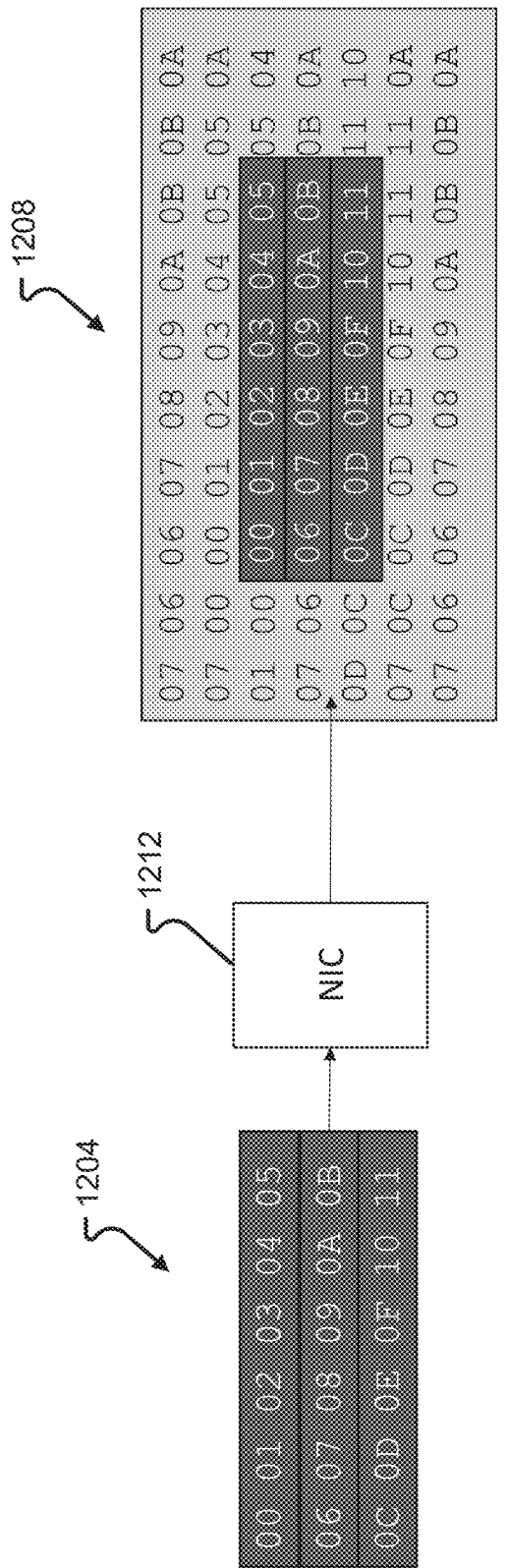
FIG. 12 illustrates another example of a data shuffle operation that may be performed by a data shuffle unit in accordance with at least some embodiments of the present disclosure.

FIG. 12 illustrates yet another example of a data shuffle operation that may be performed by a data shuffle unit 128 of a NIC 1212 in accordance with at least some embodiments of the present disclosure. The NIC 1212 may correspond to another example of a network device 104 having a data shuffle unit 128 configured to receive data in a first format, shuffle the data according to a descriptor, and then transmit the shuffled data.

In the example of FIG. 12, the NIC 1212 receives image data in the format of a first matrix 1204. Here the NIC 1212 may be configured to perform a data shuffle operation that creates a border extension. Image borders can sometimes require special handling for post-processing. If hardware support for these cases is not available internally to an accelerator, then significant performance can be lost or quality is reduced. These issues can be addressed by utilizing the NIC 1212 to perform a data shuffle operation that extends the borders of the first matrix 1204, thereby creating shuffled data in the form of a second matrix 1208. The second matrix 1208 represents the first matrix 1204, but with extended borders. The borders may be extended according to different policies and filter size (which may be defined in the descriptor 204). Examples of different policies that may be accommodated with use of the NIC 1212 include, without limitation, constant padding, mirroring, continuation, etc.

Figure 13:
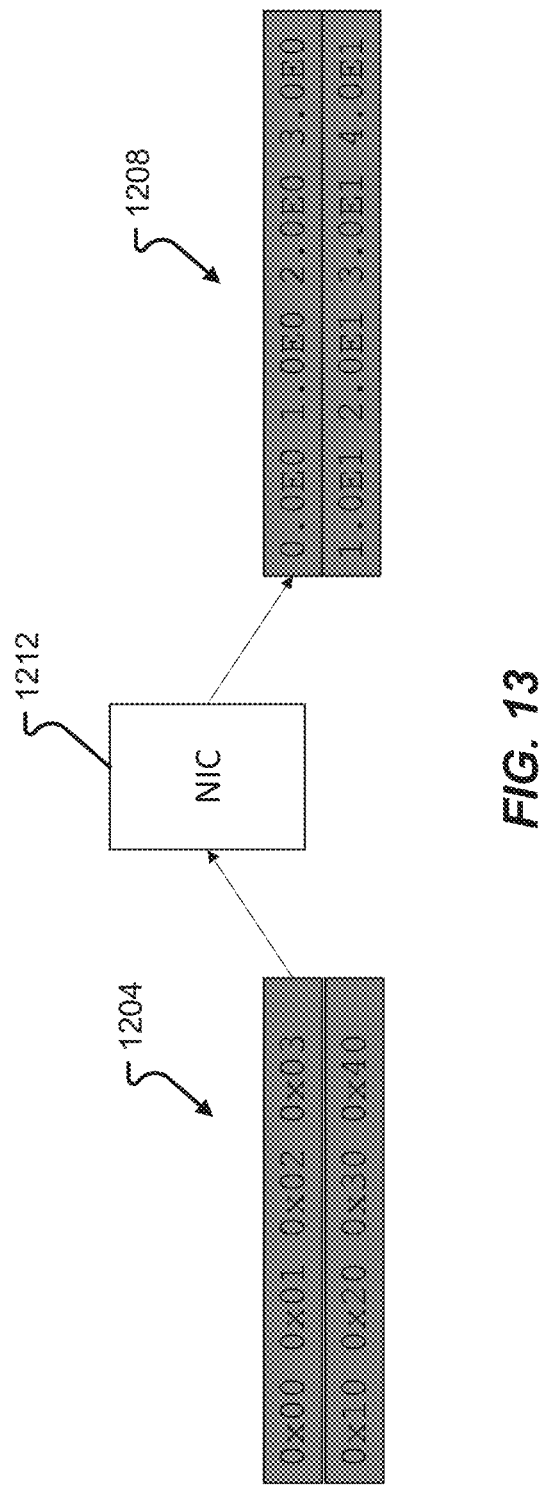
FIG. 13 illustrates another example of a data shuffle operation that may be performed by a data shuffle unit in accordance with at least some embodiments of the present disclosure.

FIG. 13 illustrates still another example of a NIC 1212 performing a data type conversion when implementing a data shuffle operation. It is possible that algorithms (which may be implemented at different data target(s) 112) have a different requirement on input data type. The NIC 1212 may be configured to accommodate the various input data type requirements of different data target(s) 112 by implementing a data shuffle operation for each data target 112. One, some, or all of the different input data type requirements may be different from the data format used by a data source 108 (e.g., a camera). For example, source data 1204 from a camera may be consumed by a data target 112 (e.g., a neural network) expecting a 32-bit floating point. The NIC 1212 may be configured to perform the appropriate data conversion on the source data 1204 to produce shuffled data 1208 having the format expected and required by the data target 112. The NIC 1212 may be configured to perform the data shuffle operation inline, thereby enabling the data target 112 to immediately start processing the shuffled data 1208 without performing its own data type conversion. Another example of a data type conversion that may be performed by the NIC 1212 is to convert floating source data 1204 to a fixed point shuffled data 1208 (e.g., normalized 0-1 fixed point).

Figure 14:
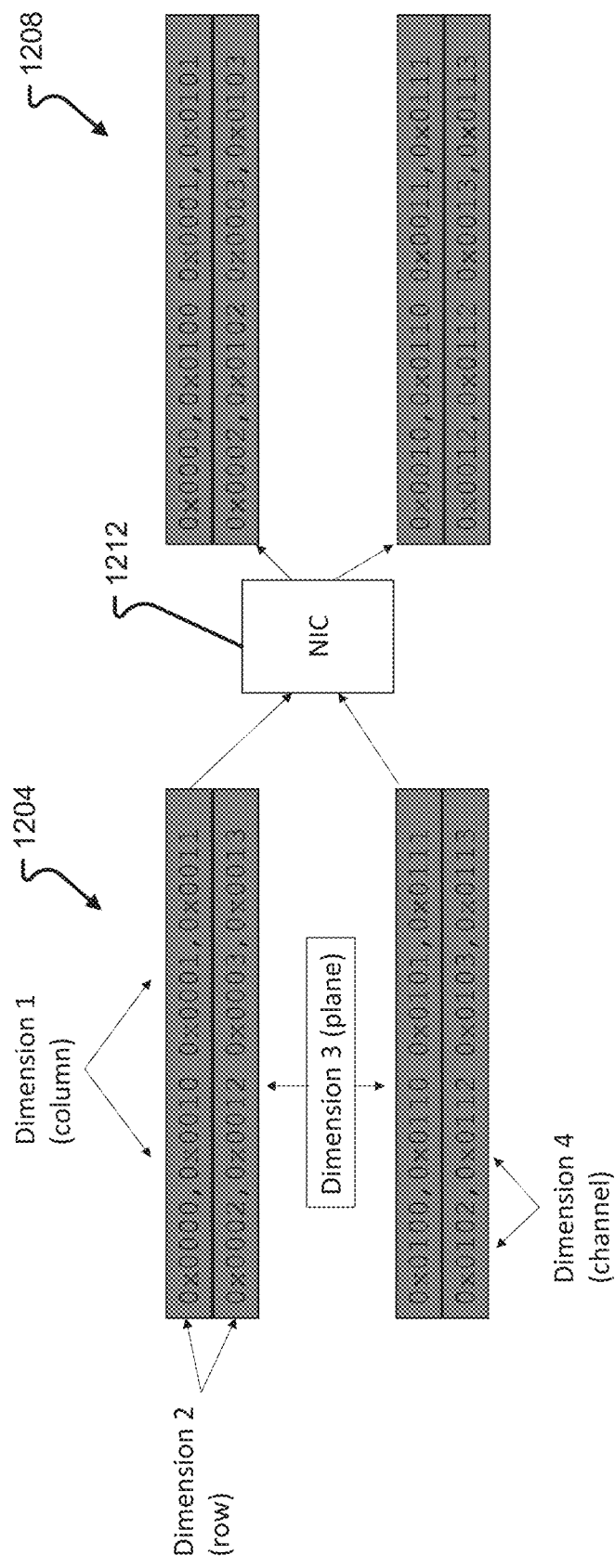
FIG. 14 illustrates another example of a data shuffle operation that may be performed by a data shuffle unit in accordance with at least some embodiments of the present disclosure.

FIG. 14 illustrates a NIC 1212 that is configured to perform a tensor layout conversion in accordance with at least some embodiments of the present disclosure. Here again, the NIC 1212 is configured to perform a data shuffle operation that causes a first matrix 1204 to be shuffled to a second matrix 1208 of a different format than the first matrix 1204. This data shuffle operation may be performed inline and while the NIC 1212 is transmitting the data from a data source 108 to a data target 112.

Tensors are high-dimensional objects used for DNNs. The representation of the data (ordering of dimensions, packing, etc.) is coupled with DNN design. In this example, the NIC 1212 is configured to convert between tensor layouts as part of data transfer in a distribute Artificial Intelligence (AI) application to facilitate interoperation of different neural networks or neural network types.

Figure 15:
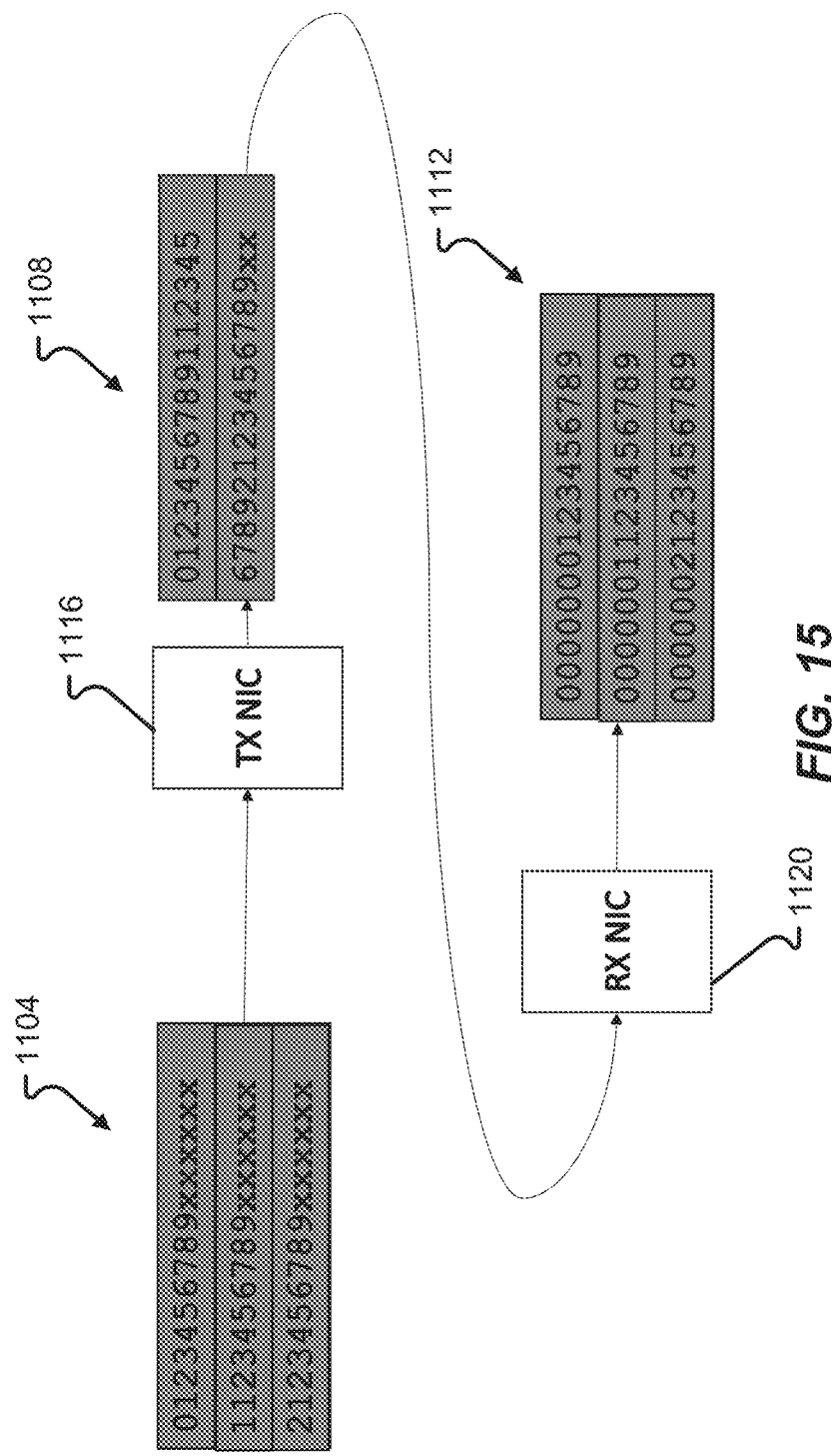
FIG. 15 illustrates another example of a data shuffle operation that may be performed by a data shuffle unit or multiple data shuffle units in accordance with at least some embodiments of the present disclosure.

FIG. 15 illustrates a transmitting NIC 1116 and receiving NIC 1120 that are configured to cooperate with one another and perform data shuffle operations that result in bit packing. As a specific but non-limiting example, deep color image data is often stored with padding bits in each word. In this example, the first matrix 1104 includes 10-bit data stored at 10 most significant bits and zero bits padded at the end to make a 16-bit word. The padding of the first matrix 1104 can be modified by the transmitting NIC 1116 if the data shuffle unit 128 of the transmitting NIC 1116 is aware of the data padding and is configured to perform a data shuffle operation that reduces the padding, thereby producing a second matrix 1108 that has reduced padding. The second matrix 1108 can be transmitted across a network with less bandwidth and may be stored with less storage costs.

The receiving NIC 1120 may then utilize its data shuffle unit 128 to strip out padding X for transmission (RGBA, YUVX) endianness in general and produce a third matrix 1112. In this example, the descriptor 204 made available to the receiving NIC 1120 to produce the third matrix 1112 may define a requirement for endianness. In the case of endianness, for example, the endianness doesn't change "on the fly" and it may be possible to utilize a general descriptor 204 with a rule, on which packets/jobs are applied. In one possible application, the transmitting NIC 1116 may be provided in a network border or network edge device that transmits data to the cloud. By reducing bit rate with the transmitting NIC 1116, the overall bandwidth required to carry the data from the data source 108 to the data target 112 can be reduced.

Figure 16:
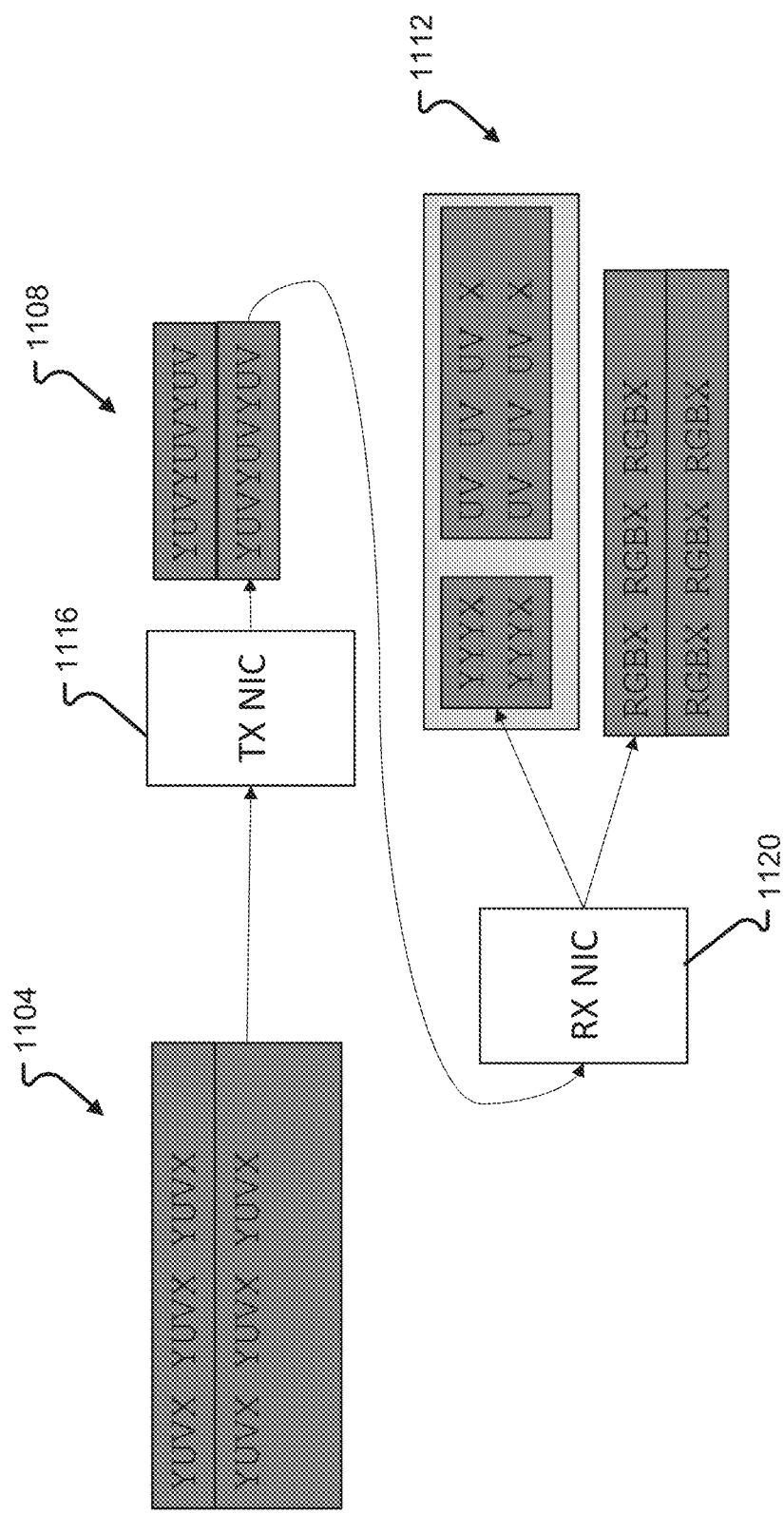
FIG. 16 illustrates another example of a data shuffle operation that may be performed by a data shuffle unit or multiple data shuffle units in accordance with at least some embodiments of the present disclosure.

FIG. 16 illustrates still another example where a transmitting NIC 1116 and receiving NIC 1120 cooperate with one another to facilitate component packing and multiple write operations. Data storage formats may have unused channels for word alignment. Multiple formats may be needed on the receiving side (e.g., at the output of the receiving NIC 1120) for different engines. Format conversions implemented by the transmitting NIC 1116 and receiving NIC 1120 could include standard transformation (e.g., YUV full-swing to studio-swing conversions or YUV to sRGB conversions). Here again, the first matrix 1104 may be shuffled by the transmitting NIC 116 to produce a second matrix 1108, which is transmitted to the receiving NIC 1120. The receiving NIC 1120 may then perform a data shuffle operation on the second matrix 1108 to produce shuffled data in the format illustrated by the third matrix 1112 (or matrices).

One possible use case for the example of FIG. 16 may include a situation where a DNN and traditional neural network operate in parallel on a common data target 112 with different layout requirements. In another possible example, different requirements between video encode (studio swing) and compute (full swing) accelerators can be accommodated by the transmitting NIC 1116 and receiving NIC 1120 performing data shuffle operations as shown. The architecture of FIG. 16 may also be useful to support special requirements for endianness, packing for data authentication separate from the compute node.

Figure 17:
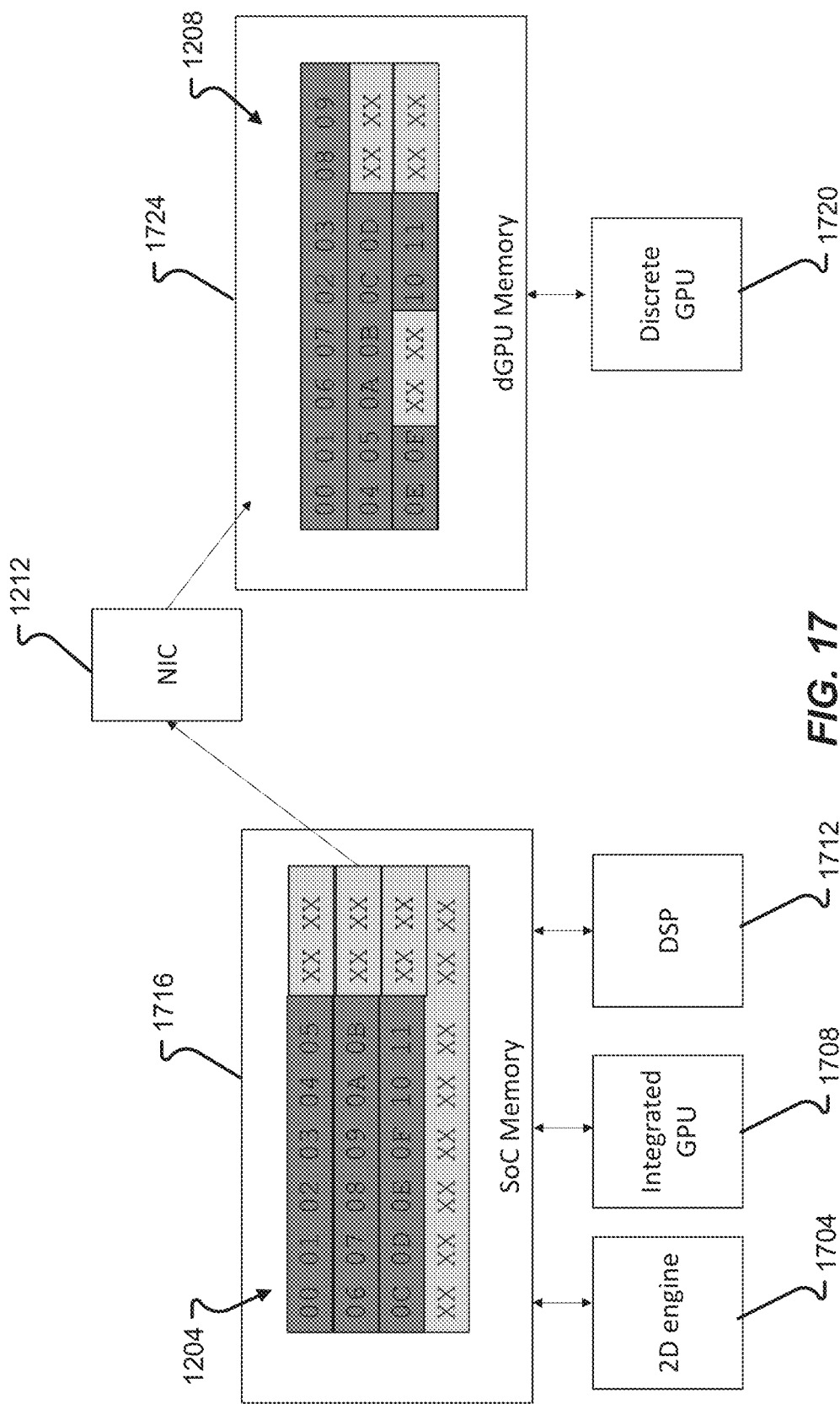
FIG. 17 illustrates another example of a data shuffle operation that may be performed by a data shuffle unit in accordance with at least some embodiments of the present disclosure.

FIG. 17 illustrates yet another example in which NIC 1212 is configured to transfer data from one memory sub-system to another memory sub-system in accordance with at least some embodiments of the present disclosure. In this example, the NIC 1212 is configured to receive data from a data source in first format (e.g., as the first matrix 1204), perform a data shuffle operation on the received data, then transfer the shuffled data to a data target in a second format (e.g., as the second matrix 1208).

In this example, the data source 108 and data target 112 may correspond to different memory sub-systems in a vehicle. The NIC 1212 may be configured to perform a format conversion inline to allow direction operation by accelerators in each system. Illustratively, the first memory sub-system is shown to include a two-dimensional engine 1704, an integrated GPU 1708, and a Digital Signal Processor (DSP) 1712. The first memory sub-system further includes System on Chip (SoC) memory 1716. Collectively, the two-dimensional engine 1704, the integrated GPU 1708, the DSP 1712, and the SoC memory 1716 may constitute the first memory sub-system and may be considered a data source 108 to the MC 1212.

The second memory sub-system may include a discrete GPU 1720 and a dGPU memory 1724. The second memory sub-system may be considered a data target 112 to the NIC 1212. By performing data shuffle operations in the NIC 1212, the first and second memory sub-systems are relieved, at least partially, of the overhead associated with performing the data shuffle operation.

Figure 18:
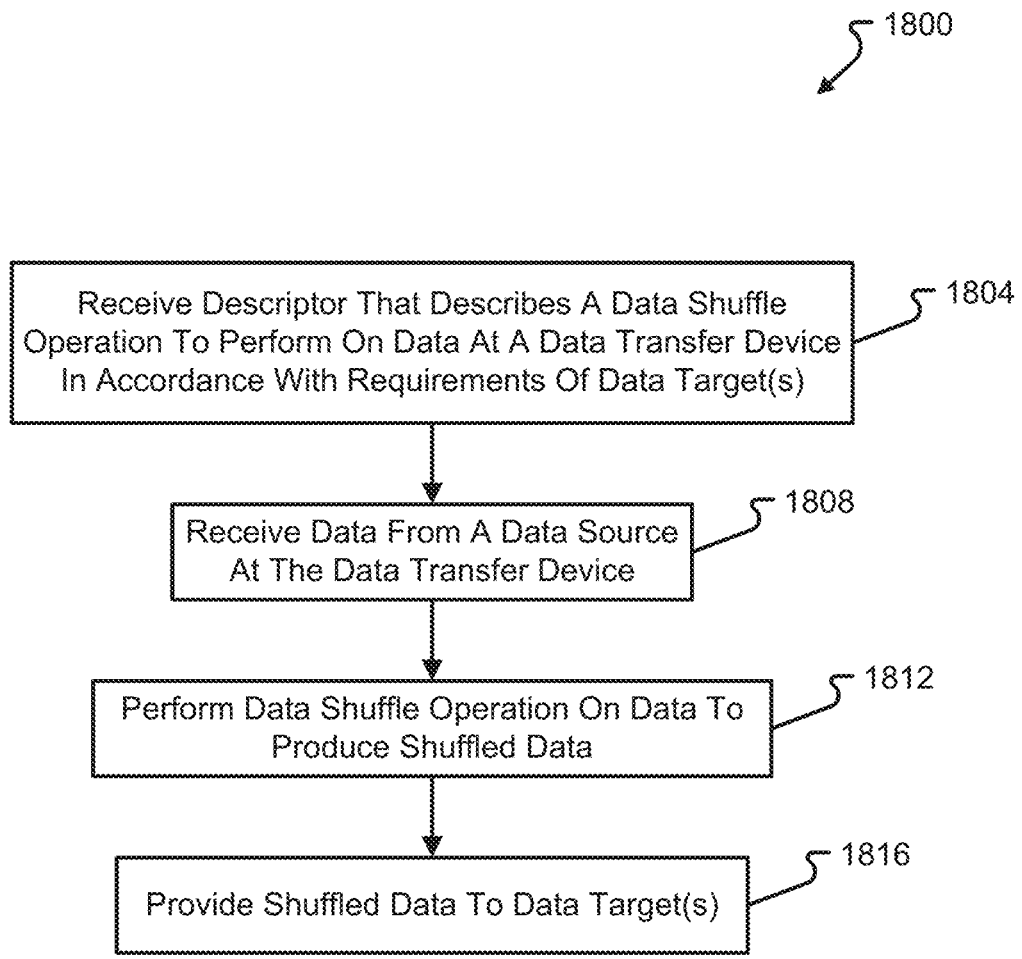
FIG. 18 is a flow diagram illustrating a method of operating a network device in accordance with at least some embodiments of the present disclosure.

Referring now to FIG. 18, various methods will be described in accordance with at least some embodiments of the present disclosure. The disclosed methods will be described in a particular order and/or as being performed by particular components of a system 100, but it should be appreciated that the steps of method(s) may be performed in any suitable order (or in parallel), may be combined with step(s) from other method(s), and/or may be performed by other components described herein.

One method 1800 is illustrated in FIG. 18, which begins when a descriptor 204 is received at a data shuffle unit 128 (step 1804). The descriptor 204 may include information that describes a data shuffle operation to perform on data at the device including the data shuffle unit 128. In some embodiments, the descriptor 204 may describe the data shuffle operation to perform in accordance with one or more requirements or processing needs of data target(s) 112. The descriptor 204 may be received prior to receiving data to be shuffled or may be requested/retrieved in response to receiving data to be shuffled.

The method 1800 continues when data is received at the network device 104 from a data source 108 (step 1808). The data may be received in a first format (e.g., as a first matrix) and may be received at a first device interface 116 that enables communications between the network device 104 and data source 108.

The method 1800 continues with the network device 104 invoking the data shuffle unit 128 to perform the data shuffle operation on the data, thereby producing shuffled data (step 1812). In some embodiments, the data shuffle operation is performed based on information contained in the descriptor 204 and is performed while the network device 104 is in the process of relaying data from the data source 108 to the data target 112.

The method 1800 may then continue with the network device 104 providing the shuffle data to one or more data targets 112 (step 1816). The shuffled data may be provided to a local data target 112 and/or remote data target 112.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A network device, comprising:
   a device interface that receives data from at least one data source; and
   a data shuffle unit that collects the data received from the at least one data source, receives a descriptor that describes a data shuffle operation to perform on the data received from the at least one data source, performs the data shuffle operation on the collected data to produce shuffled data, and provides the shuffled data to at least one data target, wherein the descriptor comprises at least one of a work queue element (WQE) posted to a queue pair, a memory region description, a description of a Remote Direct Memory Access (RDMA) request, and a description of an application-level request.

2. The network device of claim 1, wherein the data shuffle operation is done according to a descriptor provided by the at least one data source.

3. The network device of claim 1, wherein the data shuffle unit comprises a processor and memory, wherein the memory is used to store the data received from the at least one data source until a predetermined amount of data is collected, and wherein the processor performs the shuffle operation on the predetermined amount of data stored in memory.

4. The network device of claim 1, wherein the at least one data source comprises a host memory device.

5. The network device of claim 1, wherein the at least one data source comprises an on-network device memory.

6. The network device of claim 1, wherein the at least one data source comprises a peer memory device.

7. The network device of claim 1, wherein the data is received in a plurality of network packets.

8. The network device of claim 1, wherein the at least one data target comprises a plurality of data targets.

9. The network device of claim 1, wherein the at least one data target comprises at least one of a host memory device, a peer memory device, and an on-network device memory.

10. The network device of claim 1, wherein the at least one data target is located remotely from the data shuffle unit.

11. The network device of claim 10, further comprising:
    a second device interface that couples the network device with the data target, wherein the device interface comprises a communication port and wherein the second device interface also comprises a communication port.

12. The network device of claim 1, wherein the at least one data source is located remotely from the data shuffle unit.

13. The network device of claim 1, wherein the descriptor comprises the WQE posted to the queue pair and represents a single data shuffle operation.

14. The network device of claim 1, wherein the descriptor is obtained from a memory device of the shuffle unit and comprises a memory region description that is usable to perform multiple shuffle operations.

15. The network device of claim 1, wherein the descriptor is received in a network packet via the device interface.

16. The network device of claim 1, wherein the descriptor is received as part of the RDMA request or the application-level request.

17. The network device of claim 1, wherein the device interface and the shuffle unit are provided as part of a Network Interface Controller (NIC).

18. The network device of claim 1, wherein the device interface and the shuffle unit are provided as part of a network switch.

19. The network device of claim 1, wherein the data shuffle operation comprises at least one of a matrix transpose, a non-homogenous transpose, a removal of padding bits, an addition of padding bits, a tensor layout conversion, a bit packing, a component packing, and a bit tiling.

20. The network device of claim 1, wherein an application receiving the shuffled data is unaware of the data shuffle performed by the data shuffle unit.

21. The network device of claim 1, wherein the shuffled data is provided to the at least one data target via the device interface.

22. The network device of claim 1, wherein the shuffled data comprises fewer bits than the collected data.

23. The network device of claim 1, wherein the at least one data source comprises a network edge device.

24. The network device of claim 1, wherein the device interface comprises a serial data interface and wherein the data is received from the at least one data source via a serial communication protocol.

25. A system, comprising:
a device interface that receives data from at least one data source;
circuitry; and
memory coupled with the circuitry, wherein instructions stored in memory enable the circuitry to collect the data received from the at least one data source, receive a descriptor that describes a data shuffle operation to perform on the data received from the at least one data source, perform the data shuffle operation on the collected data to produce shuffled data, and then provide the shuffled data to the at least one data target, wherein the descriptor comprises at least one of a work queue element (WQE) posted to a queue pair, a memory region description, a description of a Remote Direct Memory Access (RDMA) request, and a description of an application-level request.

* * * * *